US011182938B1

(12) United States Patent
Graham

(10) Patent No.: US 11,182,938 B1
(45) Date of Patent: Nov. 23, 2021

(54) ELECTRONIC SPORTS PLAYBOOK DISTRIBUTION AND MANAGEMENT SYSTEM

(71) Applicant: Luceo Sports, LLC, Scottsdale, AZ (US)

(72) Inventor: Andrew Graham, Scottsdale, AZ (US)

(73) Assignee: Luceo Sports, LLC, Scottsdale, AZ (US)

( * ) Notice: Subject to any disclaimer, the term of this patent is extended or adjusted under 35 U.S.C. 154(b) by 0 days.

(21) Appl. No.: 17/081,847

(22) Filed: Oct. 27, 2020

Related U.S. Application Data

(63) Continuation of application No. 16/592,761, filed on Oct. 3, 2019, now Pat. No. 10,861,200.
(60) Provisional application No. 62/740,934, filed on Oct. 3, 2018.

(51) Int. Cl.
  *G06T 11/20* (2006.01)
  *G06T 13/80* (2011.01)
  *A63B 24/00* (2006.01)

(52) U.S. Cl.
  CPC ........ *G06T 11/203* (2013.01); *A63B 24/0021* (2013.01); *A63B 24/0087* (2013.01); *G06T 11/206* (2013.01); *G06T 13/80* (2013.01); *A63B 2024/0028* (2013.01)

(58) Field of Classification Search
  CPC ........ A63B 24/0021; A63B 2024/0028; A63B 24/0087; A63B 71/06; G06T 11/203; G06T 11/206; G06T 13/80; G06K 9/00; G06F 17/30
  See application file for complete search history.

(56) References Cited

U.S. PATENT DOCUMENTS

| | | | |
|---|---|---|---|
| 7,596,598 B2 * | 9/2009 | Birch | G06Q 10/10 709/204 |
| 8,690,655 B2 | 4/2014 | Meyer | |
| 9,575,621 B2 | 2/2017 | Malik | |
| 9,578,351 B1 | 2/2017 | Bynoe | |
| 9,610,491 B2 | 4/2017 | Cronin | |
| 9,656,142 B2 | 5/2017 | Thurman | |
| 10,096,259 B2 | 10/2018 | Oguchi | |
| 2016/0071548 A1 | 3/2016 | House | |
| 2017/0207926 A1 * | 7/2017 | Gil | H04W 4/70 |
| 2020/0346093 A1 * | 11/2020 | Ono | A63B 71/06 |

* cited by examiner

*Primary Examiner* — Edward Martello
(74) *Attorney, Agent, or Firm* — James David Busch

(57) ABSTRACT

An electronic sports playbook distribution and management system includes a first device. A memory coupled to a processor of the first device stores instructions that, when executed by the processor, cause the processor to generate sports playbook content. The processor is configured to determine an action (e.g., a pass, a dribbling, a cut, a screen, etc.) associated with an object (e.g., a player, etc.) based on attributes of the object (e.g., does the player have the ball?, etc.) and the path (e.g., where does the path end?, etc.). The processor is further configured to transmit, to a server, a datafile of sports playbook content including at least (a) the object, (b) the path associated with the object, and (c) the action. The system may further include a second electronic device configured to obtain the sports playbook content from the server and display a graphical representation of the sports playbook content.

20 Claims, 30 Drawing Sheets

Creation – Edit Action Path and Details

Various Playbook Representations – Mirrored on Axis

Various Playbook Representations – User / Position Highlighting

ELECTRONIC SPORTS PLAYBOOK DISTRIBUTION AND MANAGEMENT SYSTEM

CROSS REFERENCE TO RELATED APPLICATIONS

This application is a continuation of U.S. application Ser. No. 16/592,761, filed Oct. 3, 2019, which claims priority to and the benefit of U.S. Provisional Application No. 62/740,934, filed on Oct. 3, 2018. The entire content of all of the above referenced Applications and Patents are incorporated herein by reference in their entirety.

BACKGROUND

1. Field

Some embodiments of the present disclosure relate generally to providing a system and method for creating, animating, editing, and using diagrams.

2. Related Art

Creating diagrams outlining the positions and movements of objects and people can be a time consuming process. In the context of sports, a coach is tasked with drawing plays, drills, and concepts by hand on a white board, chalkboard, tablet or pad of paper. Using physical instruments such as a pen and paper is generally a fairly quick and easy process, except it does not necessarily allow for fast modification, reproduction, and/or distribution. Many companies have attempted to mimic the experience of using a pen and paper with the use of modern technology. For example, the availability of touch screens on devices such as tablet computers and smart phones has provided a new medium for use.

Previous solutions for implementing sports diagrams on mobile computing devices have provided a quick means for drawing a player positions and actions, however setting the various options for each drawn line tends to be a very tedious process. For example, past solutions have needed user input to draw a line indicating a player's movement and then set an action type (e.g., in basketball an action type may be a cut/screen/dribble/etc.) as well as indicate other options such as ball possession or color. Setting these options can take an enormous and frustrating amount of time and thereby leads to user dissatisfaction.

The above information is only for enhancement of understanding of the background of embodiments of the present disclosure, and therefore may contain information that does not form the prior art.

BRIEF DESCRIPTION OF THE DRAWINGS

Some embodiments can be understood in more detail from the following description taken in conjunction with the accompanying drawings, in which.

SUMMARY

Figure 1:
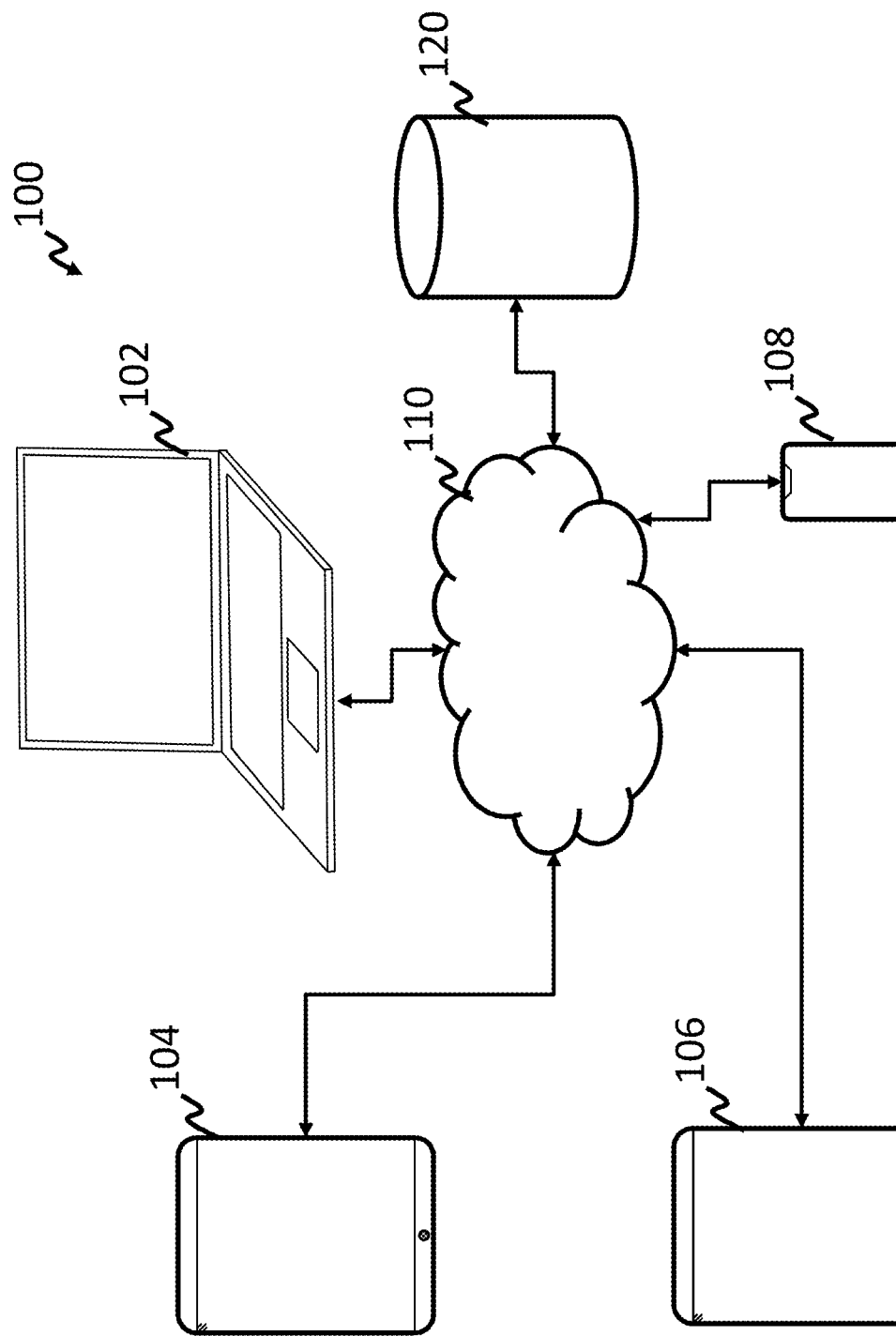
FIG. 1 depicts a general usage architecture for creating and according to various embodiments.

Aspects of embodiments of the present invention relate to a method and system for generating diagrams. In various embodiments, the system and method may be utilized to generate sports related diagrams, animations, and tests.

Aspects of embodiments of the present invention allow for a user to generate a diagram by placing one or more objects onto a surface receive an input relating to a path representing the movements and actions of the objects. The system may draw the path on the surface and may automatically adjust the drawn path according to the action.

In various embodiments, multiple objects and paths may be introduced to the surface and the drawing may be further modified according the actions and paths of the objects.

In various embodiments, the system and method may predict an action based on at least one of a first object, a first path, a second object, a second path, a third object, and a third path.

In various embodiments, an object may be a player, a ball, a defender, or a coach.

In various embodiments, an animation may be automatically generated according to the path and the action. The animation may be modified according to the multiple objects, actions, and paths and a timing of the animation may be generated based on decencies and actions between the different objects, paths, and actions.

In various embodiments, multiple diagrams may be bundled into one or more playbooks.

In various embodiments, a memory game question may be generated using the diagrams.

In various embodiments, the diagrams may be viewed by a user with an electronic device.

In various embodiments, a perspective of the diagrams may be associated with a position selected by the user.

In various embodiments, the memory game questions may be generated according to the position of the user.

In various embodiments, a diagram creator device includes a display, a touch screen covering the display, a processor coupled to the display and the touch screen, and a memory coupled to the processor. The memory stores instructions that, when executed by the processor, cause the processor to: receive an input for selecting a surface; display the surface on the display; detect the placement of a first object on the surface; detect a drawing of a first path of the first object from a first location to a second location; determine a first action associated with at least one of the first object, the first path, the first location, and the second location; and draw on the surface a first diagram associated with the first action.

In various embodiments, the instructions that, when executed by the processor, further cause the processor to detect the placement of a second object on the surface, detect the drawing of a second path of the second object from a third location to a fourth location, and determine a second action associated with at least one of the second object, the second path, the third location, or the fourth location.

In various embodiments, the instructions that, when executed by the processor, further cause the processor to generate an animation in accordance with at least one of the first object, the first path, the first location, and the second location.

In various embodiments, the instructions that, when executed by the processor, further cause the processor to generate an animation in accordance with at least one of the second object, the second path, the third location, and the fourth location.

In various embodiments, the first object includes a first player and the second object comprises a ball.

In various embodiments, the instructions that, when executed by the processor, further cause the processor to: detect the placement of a third object comprising a second player the surface; detect the drawing of a third path of the third object from a fifth location to a sixth location; determine a third action associated with at least one of the third object, the third path, the fifth location, or the sixth location; and draw on the surface a second diagram associated with the first action, the second action, and the third.

In various embodiments, the first action includes moving from the first location to the second location, the second action includes dribbling the ball and passing the ball to the second player, and the third action includes receiving the ball.

In various embodiments, the instructions that, when executed by the processor, further cause the processor to generate an animation in accordance with the first action, the second action and the third action, wherein the animation is sequentially timed in accordance with first location, second location, third location, fourth location, fifth location, sixth location, first action, second action, and third action.

DETAILED DESCRIPTION

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In various embodiments, a system and method for generating diagrams may be configured to provide a fast and efficient way for creating diagrams. In particular, the diagrams may be suitable for displaying locations, timing, and sequences for one or more objects. For example, the diagrams may be suitable for displaying sports diagrams such as diagram for displaying an offensive or defensive sports play. In various embodiments, the diagrams may be utilized in various industrial or educational applications. For example, the diagrams may be suitable for an architectural drawing, a cutting pattern, a carpentry pattern, a metal cutting pattern, a surveying pattern, a geometry lesson, or any other diagram produced in a plane.

In various embodiments, the generated diagrams may be stored and distributed. In various embodiments, a system and method for consuming the generated diagrams is also provided.

For example, the system may be used to quickly and easily generate a set play or plurality of set plays (e.g., a playbook). In various embodiments, a user may provide a user input on player positions, player movement, and any other relevant movement or locations (e.g., ball location and movement) using one or more generating devices, and the system may automatically predict the type of actions being undertaken by each player by associating the user input with a past user input. In various embodiments, the generating devices may include any suitable input devices including computing devices such as laptop, tablet, or smart phone and/or sensors such as GPS, Bluetooth, NFC, or other suitable motion/position capturing sensors. In various embodiments, the generating devices may include cameras and other optical sensors and may identify locations and movements using image processing, machine learning, and other heuristic techniques.

In various embodiments, the system is also configured to automatically create an animation for the process (e.g., a play) that has been created by predicting a timeline of an object's (e.g., a player and/or ball) movement. The system also provides a user with the ability to modify the automatically generated animations. For example, in various embodiments, a user may modify the animations and timing using a simple drag and drop feature of a graphical user interface (GUI). Once a new play is created or modified, the 20 play may be saved (e.g., in a team playbook database operating on a storage server) and distributed to one or more consuming devices (e.g., a user computer, smart phone, tablet computer, or other suitable device).

In various embodiments, the consuming devices provide an interface for consuming and interacting with the generated data. For example, a consuming device 25 may allow for a user to review one or more plays in the playbook, watch animations and videos associated with the one or more plays, play memory games associated with the one or more plays, track the users workouts and health, and allow the user to personalize/customize their experience. For example, in basketball, there may be five players from two teams on the court and each of the players may have a specific series of movements for a play based on a position that the user plays. For example, a basketball team traditionally plays with a center, two forwards, and two guards on the court at any given time (although the positions may be modified). In various embodiments, a user may personalize their experience based on the position that they play.

FIG. 1 depicts a general usage architecture for creating and according to various embodiments.

Referring to FIG. 1, in various embodiments the diagram generation and consumption system 100 may utilize multiple electronic devices 102-108 (e.g., portable electronic devices). For example, both content generating devices and content consuming devices may include electronic devices 102-108 such as tablet computers 104, 106, laptop computers 102, smart phones 108, or other electronic devices having a display and input mechanism (e.g., such as a touch screen or mouse input) that are also capable of communicating over a network 110 (e.g., the Internet). In various embodiments, the content generating devices and the content computing devices 102-108 may be configured to access a remote storage server 120 that stores the various content generated on the generating device for usage by the consuming device. For example, the content generating device may be used to create and modify the content and may then upload the generated content to the storage server 120. The content consuming device may download the content and provide feedback to the storage server regarding the consumption of the content. For example, the feedback may include the type of content consumed, the quantity of content that was consumed, the time spent consuming it, scores associated with the consumption (e.g., test scores, memorization game scoring, etc.), etc.

In various embodiments, the content may include a playbook having animated plays [1506][17a-f], video examples [1502][1600], contextual notes [1505], and play call GIFs [1503]. The playbook may also be configurable based on user position and allows for plays to be modified. For example, the playbook may allow for the user to mirror the execution of the play across an axis [1500a][1500b][1501a][1501b]. In various embodiments, the content may include personalized object, action, notation highlighting, spotlight focusing and or other methods to call attention to the user's relevance to the displayed content. [1800a][1800b]

In various embodiments, the memorization games may include randomized questions, recognition games with matching, animations and video, and responsibility games requiring users to draw their movements. The games may include lightning rounds featuring progressive scoring. Final scores may be reported and added to a team leader board.

Figure 2:
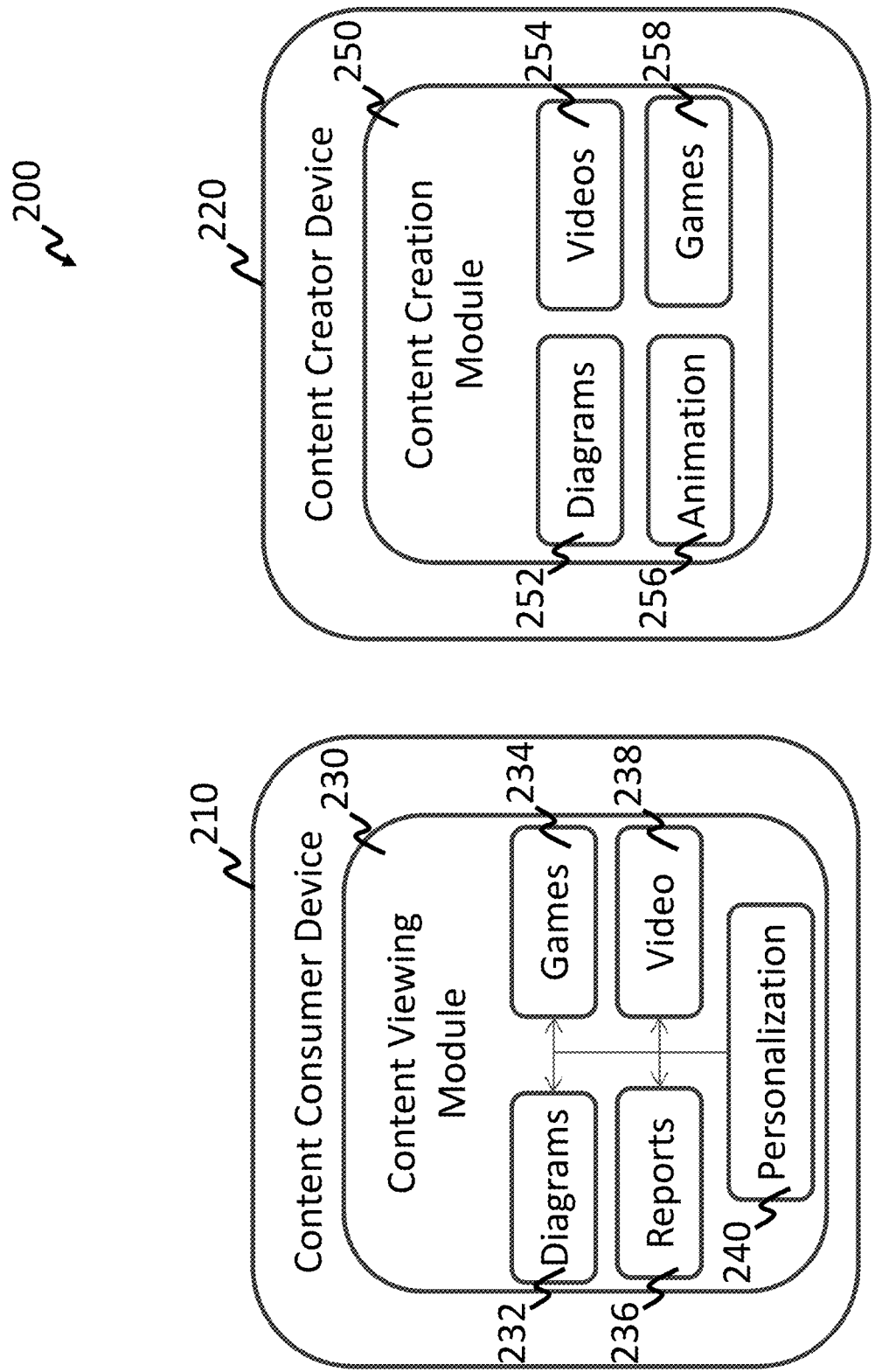
FIG. 2 depicts an architectural diagram of a generation and consumption system according to various embodiments.

FIG. 2 depicts an architectural diagram of a generation and consumption system according to various embodiments.

Referring to FIG. 2, in various embodiments, the system 200 includes content consumer devices 210 and content generation (e.g., creation) devices 220. Content consumer devices 210 may include a content viewing module 230 configured to present the various types of content accessible by the system 200. For example, the content viewing module 230 may include a diagram module 232, a games module 234, a reports module 236, a video module 238, and a personalization module 240. In various embodiments, the diagrams module 232 is configured to access, display, and allow for interaction with the various diagrams from a playbook. In various embodiments, the diagrams module 232 may track user usage to determine which plays the user has accessed and how much time the user has spent viewing each play and/or playbook. In various embodiments, the games module 234 is configured to allow for the user to play memory games, score the user's proficiency at the games, and log the games played by the user, the time spent by the user playing the games, the number of games played, and the scores achieved. In various embodiments, the video module 238 may be configured to play videos (e.g., game related footage) for viewing by the user, and log the videos played by the user and the time spent watching videos. In various embodiments, report module is configured to display feedback regarding the consumption of content by the user. For example, the reports module 236 may be configured to receive the information logged by the diagrams module 232, the games module 234, and the video module 238 and provide textual and graphical representations of the user's use and interaction with the content viewing module 230. In various embodiments, the content viewing module 230 may include a personalization module 240 configured to receive a user input (e.g., a player position) and provide the input to the other modules for modifying their content and/or behavior. For example, when the playbook is for a sport such as basketball, a user may need to study plays based on their position. For example, a point guard may have more dribbling and passing than a forward who may set more screens and off-ball movement. Thus, the system may be modified to present the most relevant information for a user. For example, a user may input their player position to the personalization module 240 and the diagrams module 232 may be provided with the position information and modified to show diagrams with the perspective of the player position. Similarly, the games module 234 may be modified to test the player's knowledge of their specific position. The users may also personalize the operation of the content viewing module.

In various embodiments, the content viewing module 230 may include other suitable modules. For example, in various embodiments, the content viewing module 230 may also include a game plan module for displaying team strategies for achieving various team and player objectives. In various embodiments, the content viewing module 230 may include a workout and/or nutrition module for tracking the user's participation in various exercise activities, game related drills, and nutritional regimen (i.e., a user's diet).

In various embodiments, a content creator device 220 may operate a content creation module 250. The content creation module 250 may include a tool for creating diagrams, a diagram generation module 252 for creating plays, video module 254 for providing videos, an animation module 256 for creating animations based on the plays, and a game generation module 258 for generating games.

In various embodiments, the diagram generation module 252 may allow a user to design a diagram quickly and efficiently. For example, the user may provide an input, such as a touch input on a selected background. For example, the selected background may be of an architectural drawing, a cutting pattern, a carpentry pattern, a metal cutting pattern, a surveying pattern, a football field, a soccer field, a half of a basketball court, a volleyball court, or any other diagram produced in a plane (i.e., the background may be based on a selected sport or industry). A user may then provide an input to overlay objects onto the selected background. For example, the user may provide a touch or a mouse input to position players, objects, and paths. In various embodiments, the system may provide smoothing based on the user input to provide an experience similar to writing on a traditional fixed medium such as a whiteboard or chalkboard.

In various embodiments, the diagramming of a play may include ball location. For example, a diagram for a basketball play may include a coded line based on who has the ball and the action being taken. For example, a player with the ball that is dribbling may be shown moving along a path with a zig zag or similar line while passing the ball may be represented by a dashed line. In various embodiments, the system may utilize predictive drawing. For example, the system begins with each player location and a ball location (e.g., a player with possession of the ball). The system may then use the relative sequencing, relative start timing, starting location, relative end timing, ending location, and classification or identification of all actions to predictively draw. For example, at any relative point in time of a drawing/animation, the system uses the input data received to understand what each object has done to that point (i.e., location, travel, and action classification) and where their current location and possession status (i.e., who has the ball). At any relative point in time of a drawing/animation, the system may utilize the input data received to that point for a "Next Action" object to understand their current location and possession status. After receiving a "Next Action" (e.g., that has not been predicted or animated) input data from source, the system is configured to run the prediction algorithms as input data is received. Thus, based on the object's action location, path, starting and ending possession status, relative locations and possession status of other objects including their entire action path between start and end locations may be utilized to derive the most likely intended action classification, object path and ending location, animation sequence, animation duration/velocity, and/or animation relative start and end timing.

For example, when a first player has the ball, a line from the player's starting position to another location on the court may be automatically drawn as the player dribbling the ball. Similarly, when a line is drawn from the first player with the ball to a second player, the system may infer a pass. Then, a subsequent movements from the second player may be automatically assumed to be a dribble, a pass, or a shot. A user may also use taps and gestures to toggle different options for the diagram. For example, after drawing the path of a player, the user may tap at the end location to select that the player will set a screen.

In various embodiments, the animation module 256 may automatically generate animations during the creation of the diagrams. For example, the creation of a diagram using the diagram module 252 allows for the animation module to automatically create a timeline for the player movements. For example, the timeline of the user diagramming the play may provide guideposts for automatically generating an animation by the animation module 256. For example, if a first player has the ball at a first location and then passes the ball to a second player at a second location, the second player would not move from the second location until receiving the pass. Thus, the diagram module 252 and animation module 256 may infer that any diagrammed subsequent movements by the second player happen after the second player receives the pass. Similarly, if a first player is diagrammed as setting a screen, the first player would be expected to remain stationary until a second player passes by the location of the first player (e.g., to use the screen). Thus, the sequencing and timing may be inferred based on the location of the ball. In various embodiments, the animation sequencing may automatically be displayed to the user while the user is diagramming the play and the user may adjust the timing. For example, the user may drag a player's animation to a different location on a timeline. The user may also expand or condense the timing as needed to space the player motion. The player motion may also be set to a normalized velocity for each player, or some player movements may be set as faster or slower. In some embodiments, the diagram module 252 and the animation module 256 may be combined into a single module. Similarly, the games module 258 may also be integrated with the diagram module 252 and/or the animation module 256.

In various embodiments, the game module 258 may utilize the player positions and timing generated in the diagram module 252 and generate one or more questions related to the individual player making the movement.

Figure 3:
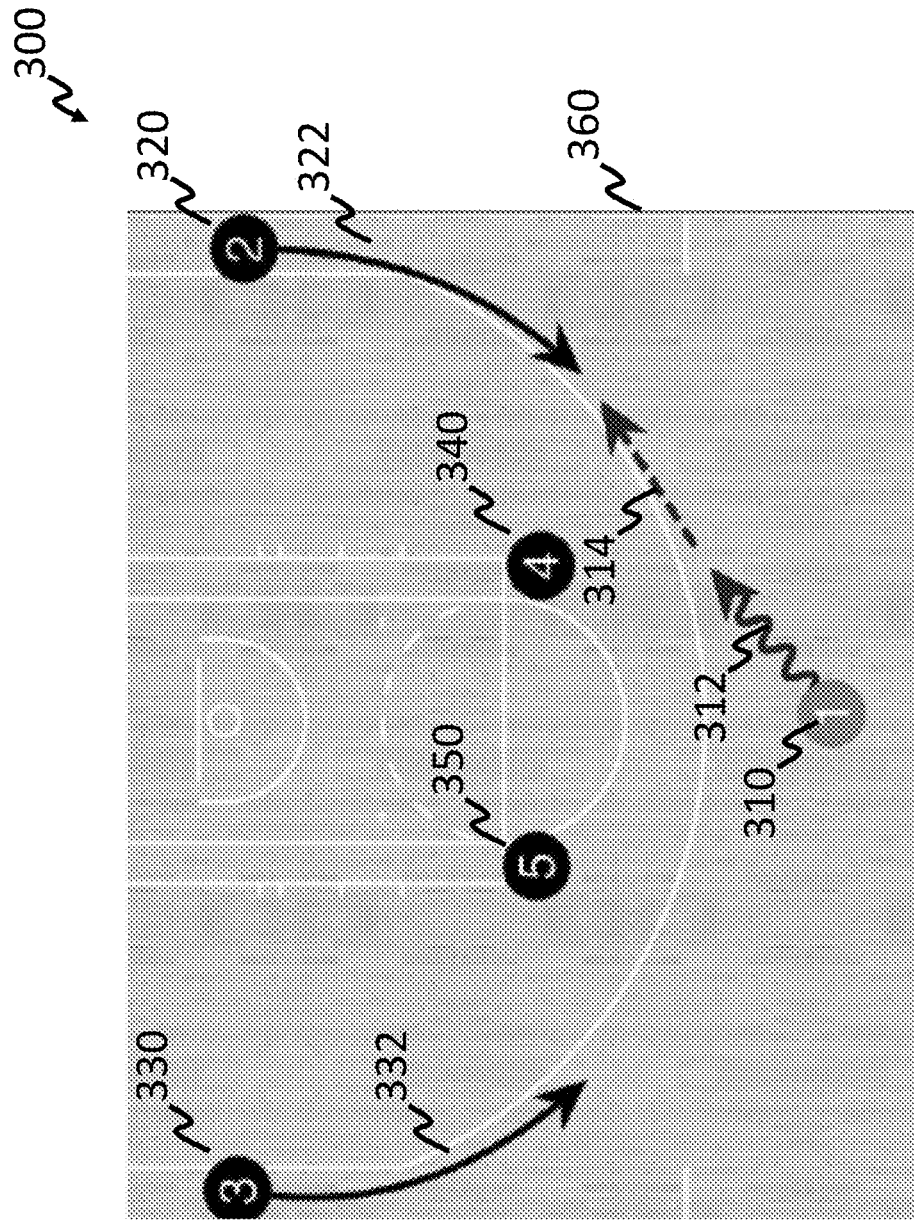
FIG. 3 depicts an example basketball play according to various embodiments.

FIG. 3 depicts an example basketball play according to various embodiments.

Referring to FIG. 3, in various embodiments the diagram generation and consumption system 100 may be used to generate and view one or more basketball plays included in a playbook. For example, a play may include a suitable court, field, or map as well as any suitable number of players and player/ball movements. In various embodiments, a play 300 may be a basketball play for use on a basketball court 360. Basketball is typically played using five players on each team, however, basketball may be played with any suitable number of layers (e.g., one on one, two on two, three on three, etc.). The play 300 includes five players 310, 320, 330, 340, 350. The players 310, 320, 330, 340, 350 may each have an assigned position (e.g., point guard, shooting guard, forward, power forward, and center) or the play may not include any particular positions. A first player 310 may be in possession of a ball and the play 300 may direct the first player 310 dribble along a first path 312 and pass the ball along a second path 314. The second player 320 and third player 330 may be directed to move along designated paths 322, 232. The fourth player 340 and fifth player 350 may remain in the same location.

In various embodiments, as the user is drawing a diagram, the system (e.g., the diagram module 252)

In various embodiments, the diagram may also include defensive player locations and include defensive player movements, line of sight, etc. In some embodiments, diagrams and animations may be included based on different play options based on the defensive player positions and line of sight.

In various embodiments, the content creators may also include real videos showing the execution of the diagrams and include layovers of the diagrams versus the execution. For example, real game day video and location information may be utilized to diagram a player's movement. For example, location information may be captured using visual tracking, motion capture, or GPS or GPS like location tracking.

Figure 4B:
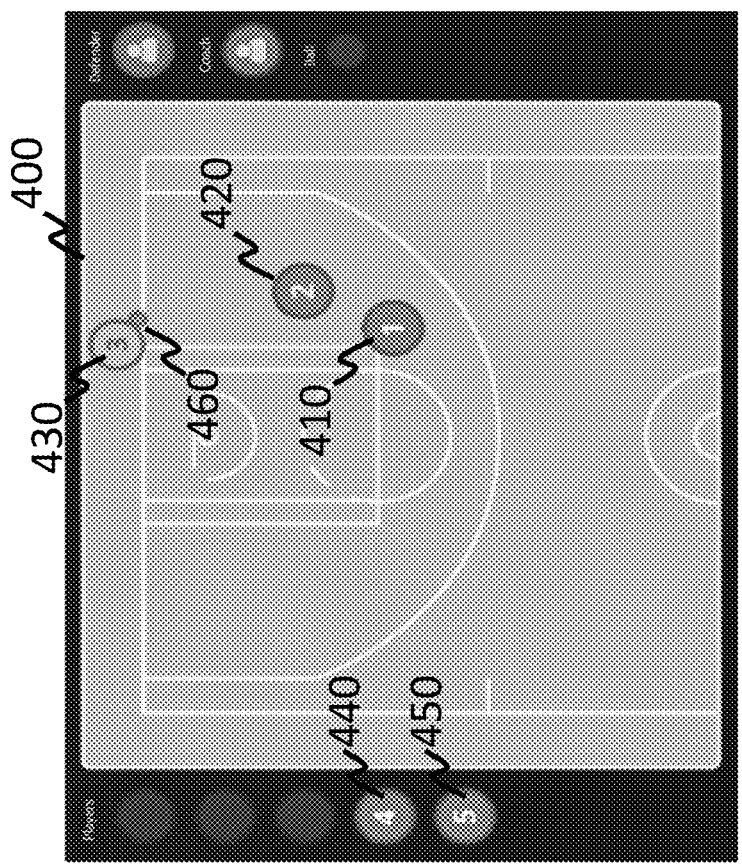
FIGS. 4A-4H depict example diagrams according to various embodiments.
Figure 4A:
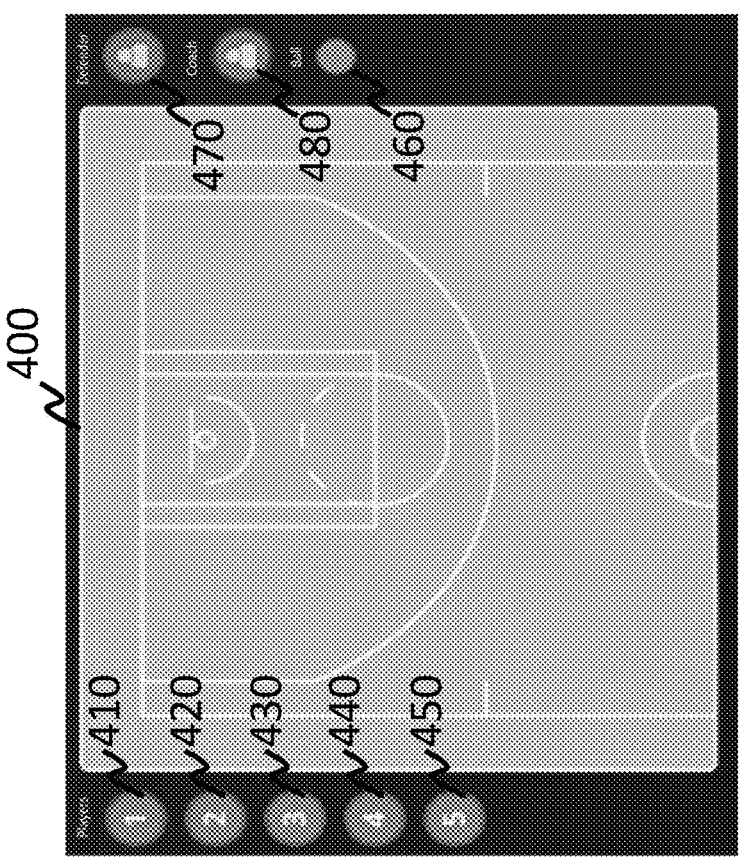
Figure 4C:
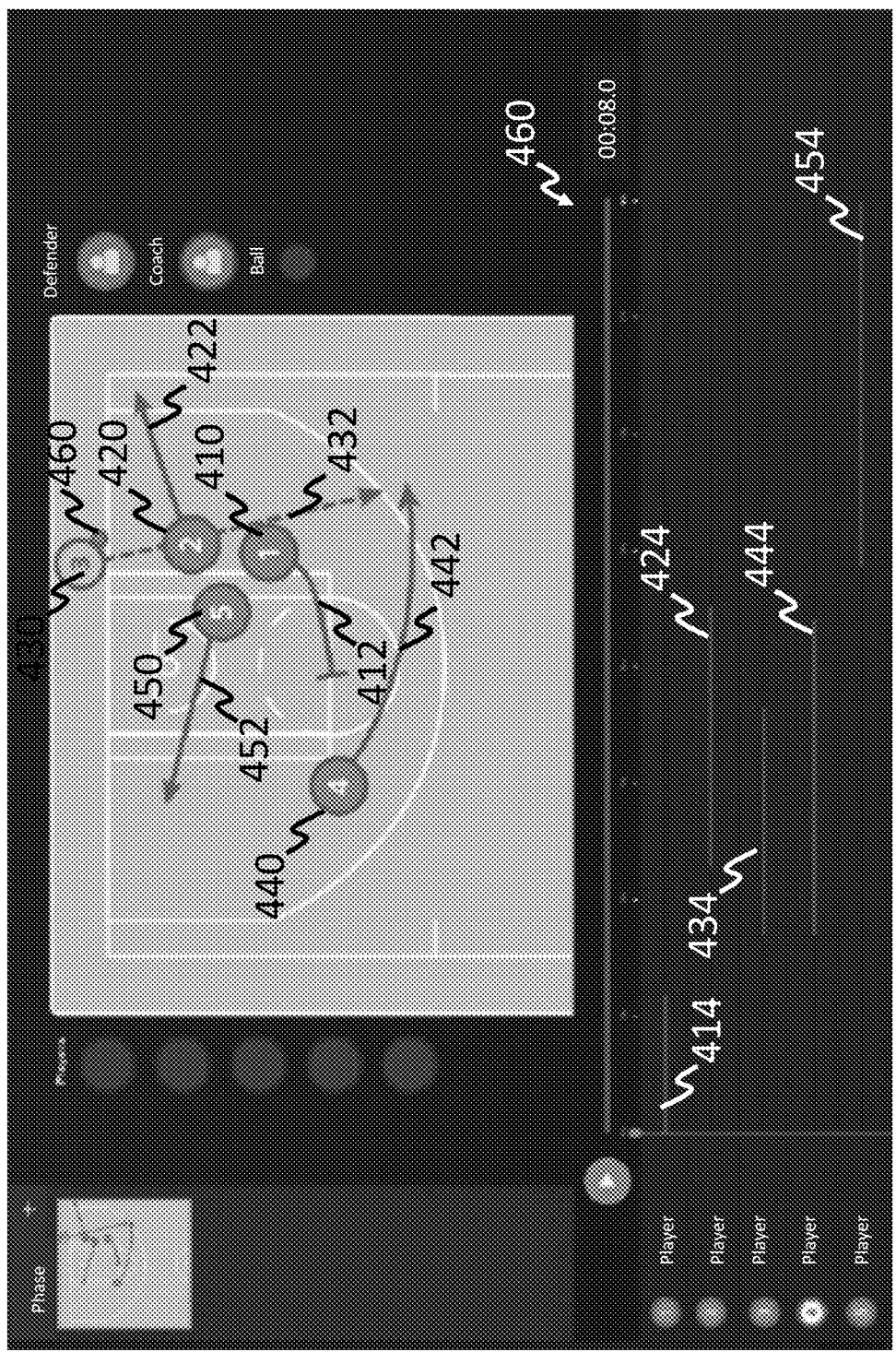
Figure 4E:
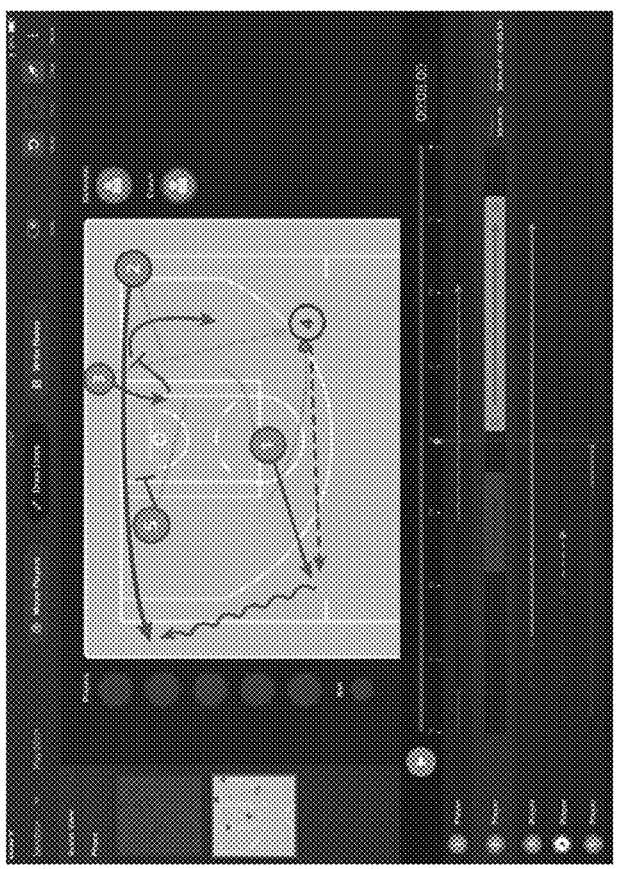
Figure 4D:
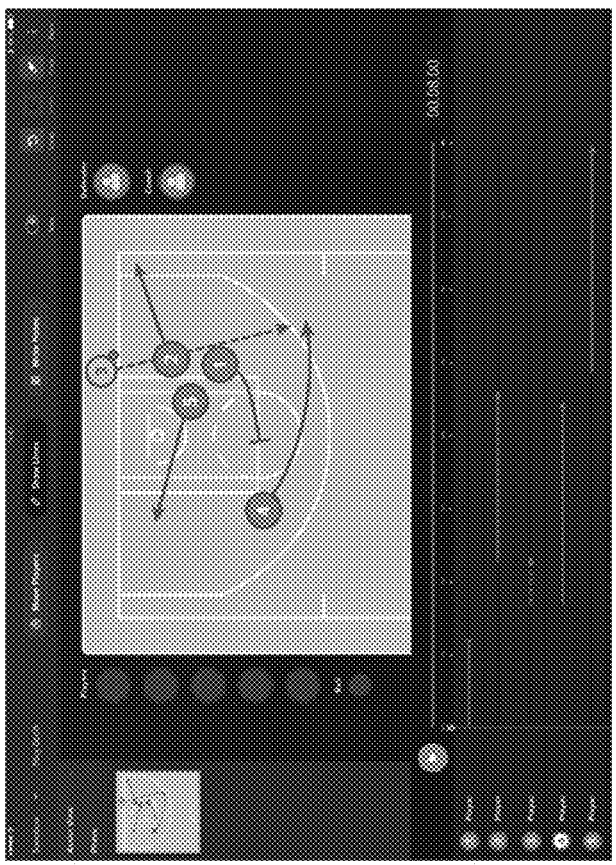
Figure 4G:
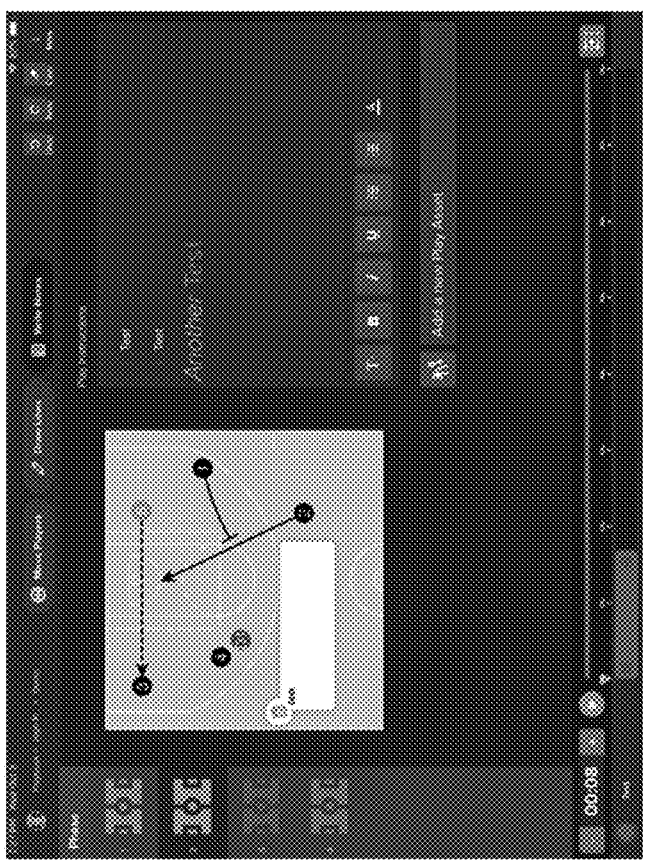
Figure 4F:
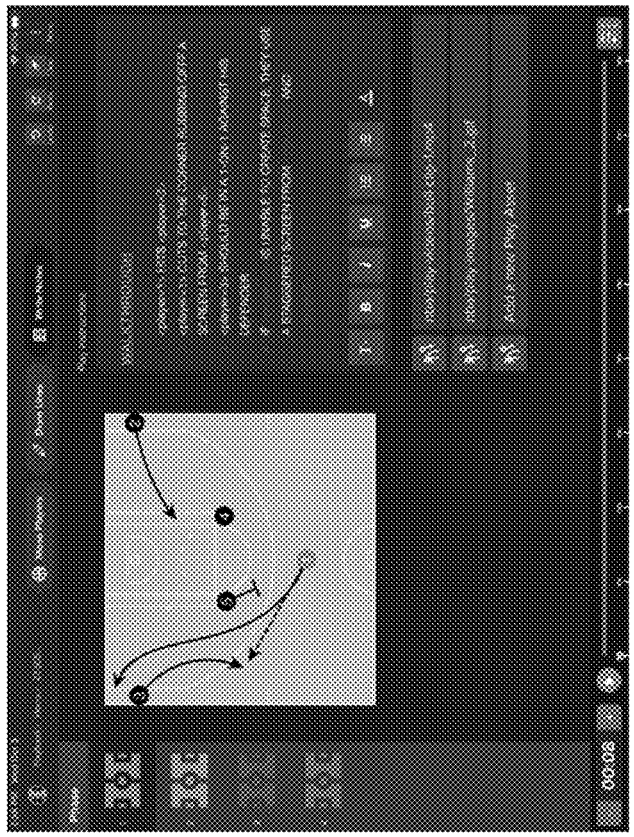
Figure 4H:
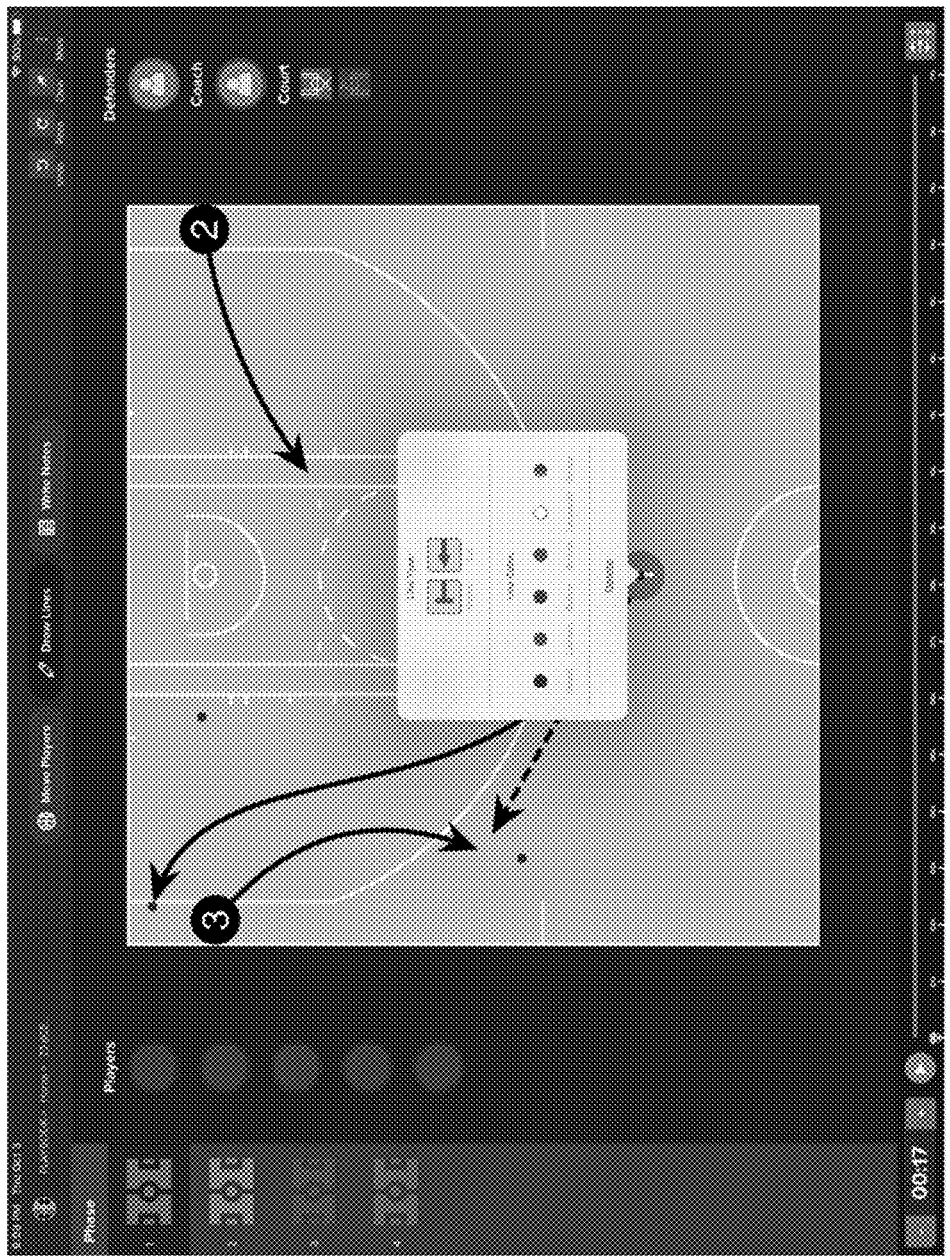
Figure 5:
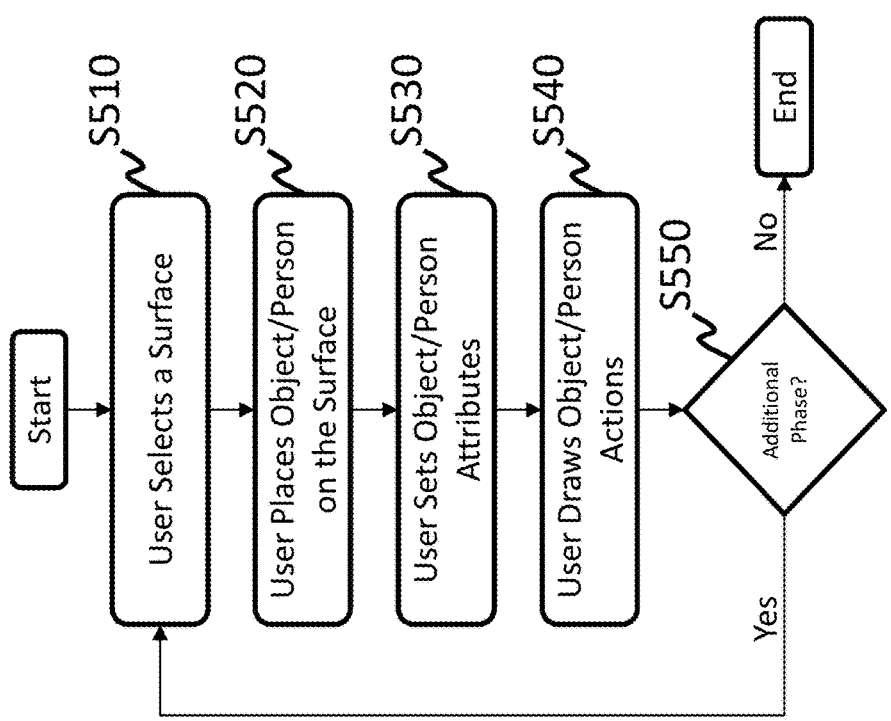
FIG. 5 depicts a method of predictive drawing and automatic animation generation according to various embodiments.

FIGS. 4A-4H depict example diagrams according to various embodiments. FIG. 5 depicts a method of predictive drawing and automatic animation generation according to various embodiments.

Referring to FIGS. 4A-4H and 5 with continued reference to FIG. 2, in various embodiments, the system (e.g., the diagram module 252) is configured to record drawing data provided by the user according to a method of creating a diagram 500.

For example, a user may select to create a new content using the content creation module 250. The user may then select to create a new diagram (e.g., a new play) using the diagram module 252 and the animation module 256 may concurrently create animations corresponding to the new diagram. In various embodiments, the user may be prompted to enter a play name and to associate the play with an existing playbook or a new playbook. In various embodiments, the user may then be prompted to select a surface type may receive user input from the content creator device 220 (S510). The selected surface may then be used to define a coordinate plan based around common sporting surfaces (example, an NBA basketball court, HS Basketball Court, NFL Football field, etc.). For example, as shown in FIG. 4A, an NBA basketball court 400 may be selected as a surface. Based on the selected surface, the diagram module 252 may automatically populate objects such as players 410, 420, 430, 440, 450, 470, and physical objects (e.g., a ball) 460 associated with the surface. In various embodiments, a coach 480 may also be included (e.g., for the execution of a drill).

In various embodiments a user may then begin the placement of players and/or objects (S520). For example, representations of people (players 410-450, defenders 470, coaches 480, etc.) or objects (a ball 460, cones, machines, note bubbles, etc.) at their respective starting coordinates on the surface. The user may the set the object/person attributes (S530). For example, the user may be allowed to record any specific attributes to the object/person. The attributes may include labels, colors, or any other suitable attributes. The user may also set an attribute related to a player and an object. For example, the beginning of a play may include an attribute related to the possession of the ball 460. The animation module 256 may utilize the starting locations for the beginning of an animation associated with the play.

In various embodiments, the user may begin drawing object/person actions after the starting positions of any people and/or objects have been set (S540). For example, the user may draw or trace actions 412, 422, 432, 452 in the order that actions are meant to take place. For example, the user may draw a player dribbling by drawing a zig zag shape between a starting location and an ending location. In another example, the user may draw a line from a first player to a second player to indicate a pass between players. In various embodiments, the diagram module 252 may utilize a series of tests to determine the intended action type such as current possession attributes, proximity to other players and their actions, etc. The diagram module 252 may also update any possession based attributes to keep track of the location of each player 210-250. Furthermore, an action's animation duration 460 may be calculated by looking at the length of the action's path, the action type, target velocity, etc., along with the total time of the current play. For example, a play may be designated as being 8 seconds long. Thus, it may be assumed that each player will be at an ending location at the end of 8 seconds and at various other locations based on the actions that are defined in the play. For example, each of the traces may also be associated with an animation indicative of the action taking place (e.g., a dribble or pass animation). For example, an actions starting point (e.g., a first location) may be utilized and the timing of dependent (e.g., a pass and subsequent dribbling upon receiving the ball 460) and related actions (e.g., concurrent movements) may automatically be inferred with any needed spacing (e.g., a pause between catching a ball and beginning to dribble). For example, a first player 410 may travel along a first path 412 and stop to set a screen. A fourth player 440 may travel along a fourth path 422 and arrive at the end of the path 412 at relatively the same time as the first player 410 (e.g., so the first player 410 may set a screen for the fourth player 440). Meanwhile, the second player 420 may travel along the second path 422 and the fifth player 450 may travel along the fifth path 452. The fourth player 440 may arrive at a stopping location as the ball is passed by the third player 430 along the path 432. Thus, based on the action being taken, the timing of player movements 414, 424, 434, 444, 454 relative to each other may be inferred.

In some embodiments, a user may need additional room to diagram the next phase of a play. Thus, the user may select an option to create a new phase (S550). When a user selects to begin a new phase, the diagram module 252 may clear the surface 400 of all actions while maintaining the locations and attributes of each player and object. All new actions may then be tagged as occurring during this phase and a new independent timeline may be established. A user may select as many phases as they desire. For example, FIGS. 4D and 4E depict examples of a multi-phase play and timeline components. For example, FIG. 4D includes a first phase and the first timeline components and FIG. 4E includes a second phase and second timeline component along with the first phase and first timeline components which are depicted in a lighter color to provide context for the second phase while still allowing for the easy viewing of the second phase.

In various embodiments, the user may provide general play-related notes, add media such as videos, or add contextual notes to each play. For example, referring to FIG. 4F, a play may include walkthrough notes and embedded video and GIFs. Referring to FIG. 4G, a timing based contextual note may be added for a certain part of a play.

In various embodiments, a user may elect to modify any locations and/or actions at any time. For example, referring to FIG. 4H, the user may select a player to modify the action that was automatically generated. For example, the user may change a screen to a cut (or vice versa) or modify the line color.

Figure 6:
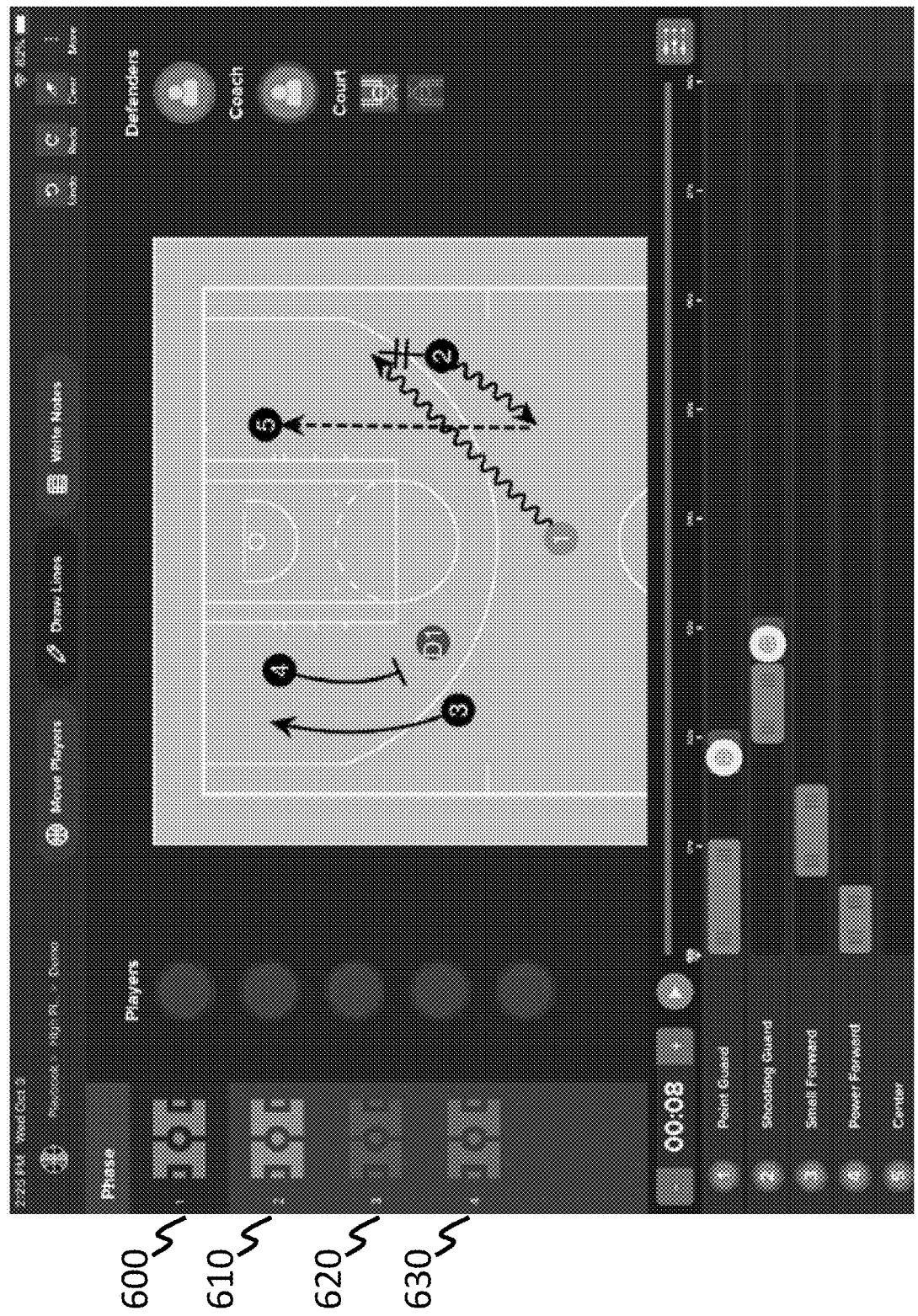
FIG. 6 depicts a play having a plurality of phases according to various embodiments.

For example, FIG. 6 depicts a play having a plurality of phases according to various embodiments.

Referring to FIG. 6, the play may include a first phase 600, a second phase 610, a third phase 620, and a fourth phase 640. In various embodiments, each of the phases may be associated with a color. Thus, the user may be able to cycle through the various phases and easily identify the current phase being displayed.

In various embodiments, a timeline 490 may be generated. For example, the diagram module may perform calculations on each action to maintain their relativity intact while expanding their durations so that the final action ends at 95% of the overall animation timeline. A user may modify the timeline as necessary to provide the correct sequencing of the play. Once a play has been finalized, it may be saved and distributed.

Thus, the diagram module 252 captures all aspects of the play as indicated by the user drawing as it relates to real-life movements (e.g., the sequencing and timing) instead of a print version of a play that is static and shows all of the movements at the same time. For example, in various embodiments, the system infers a user's intention and automatically assign options/attributes to every action removing the dependency on the user to set them. Using the data the system records about what happens within a play, the system is able to give the user a fully animated version of their drawing automatically when they complete the play instead of having to spend more time to create it.

Figure 7:
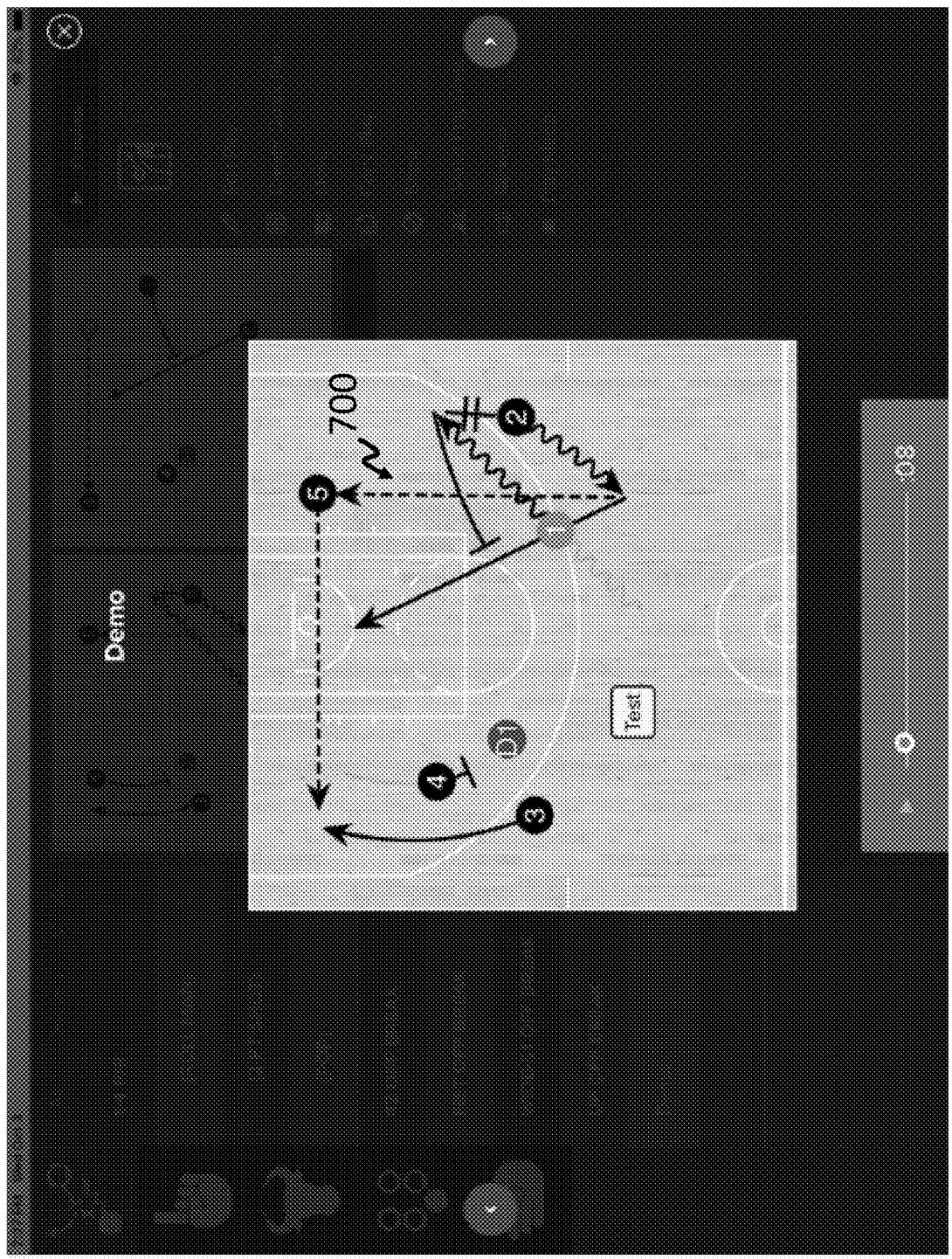
FIG. 7 depicts an example animation according to various embodiments.

FIG. 7 depicts an example animation according to various embodiments.

Referring to FIG. 7, in various embodiments, the animation module 256 may be utilized to preview the generated animation 700. After reviewing the animation 700, the user may elect to return to the diagram module 252 to adjust timing, routes, and actions as desired.

Figure 8:
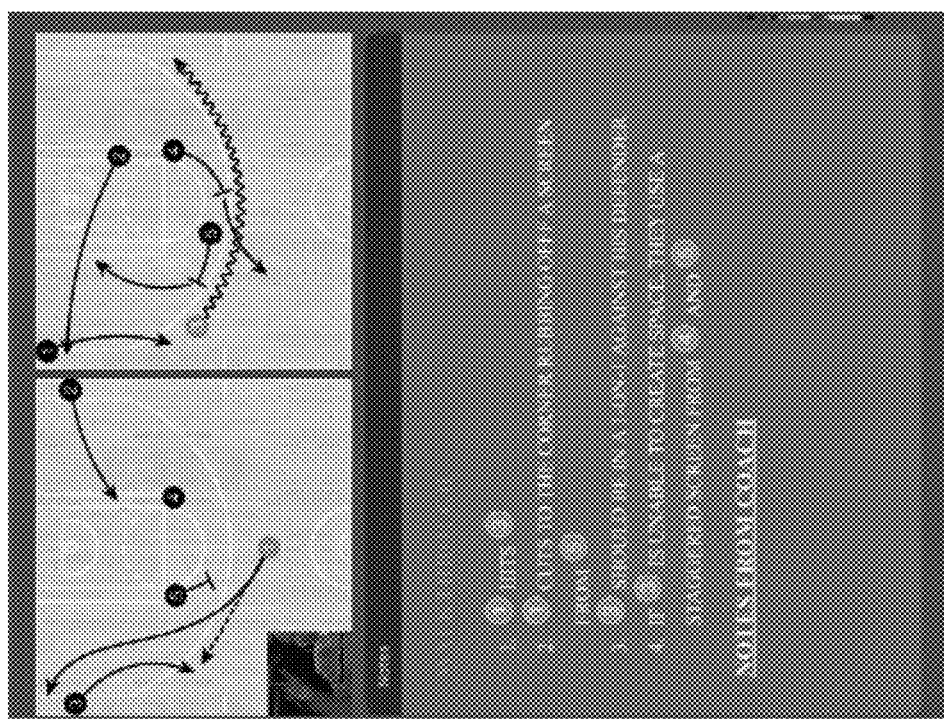
FIG. 8 depicts an example walkthrough and notes of a play according to various embodiments.

FIG. 8 depicts an example walkthrough and notes of a play according to various embodiments.

Referring to FIG. 8, a user may provide any detailed walkthrough information and/or notes 800 to be associated with the play and later be viewed by another user.

Figure 9B:
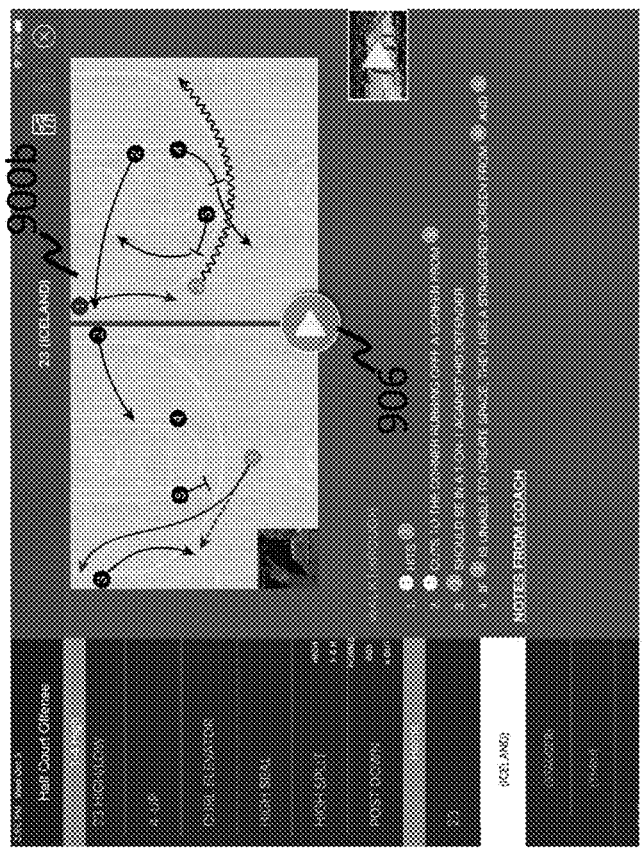
FIGS. 9A and 9B depict different playbook representations according to various embodiments.
Figure 9A:
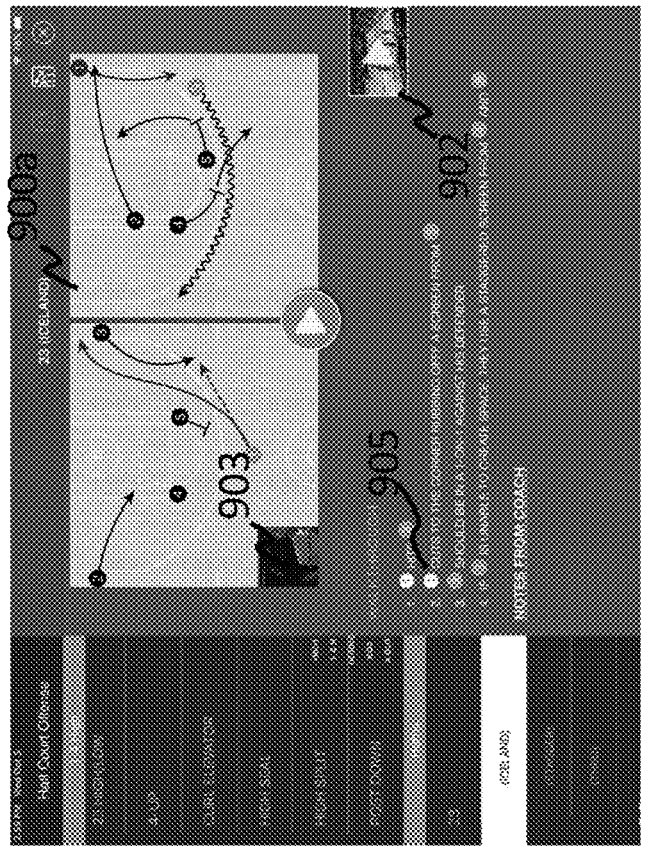

FIGS. 9A and 9B depict different playbook representations according to various embodiments.

Referring to FIGS. 9A and 9B, in various embodiments, the content may include a playbook having animated plays 906, video examples 902, contextual notes 905, and play call GIFs 903. The playbook may also be configurable based on user position and allows for plays to be modified. For example, the playbook may allow for the user to mirror the execution 900a, 900b of the play across an axis. In various embodiments, the content may include personalized object, action, notation highlighting, spotlight focusing and or other methods to call attention to the user's relevance to the displayed content.

Figure 10:
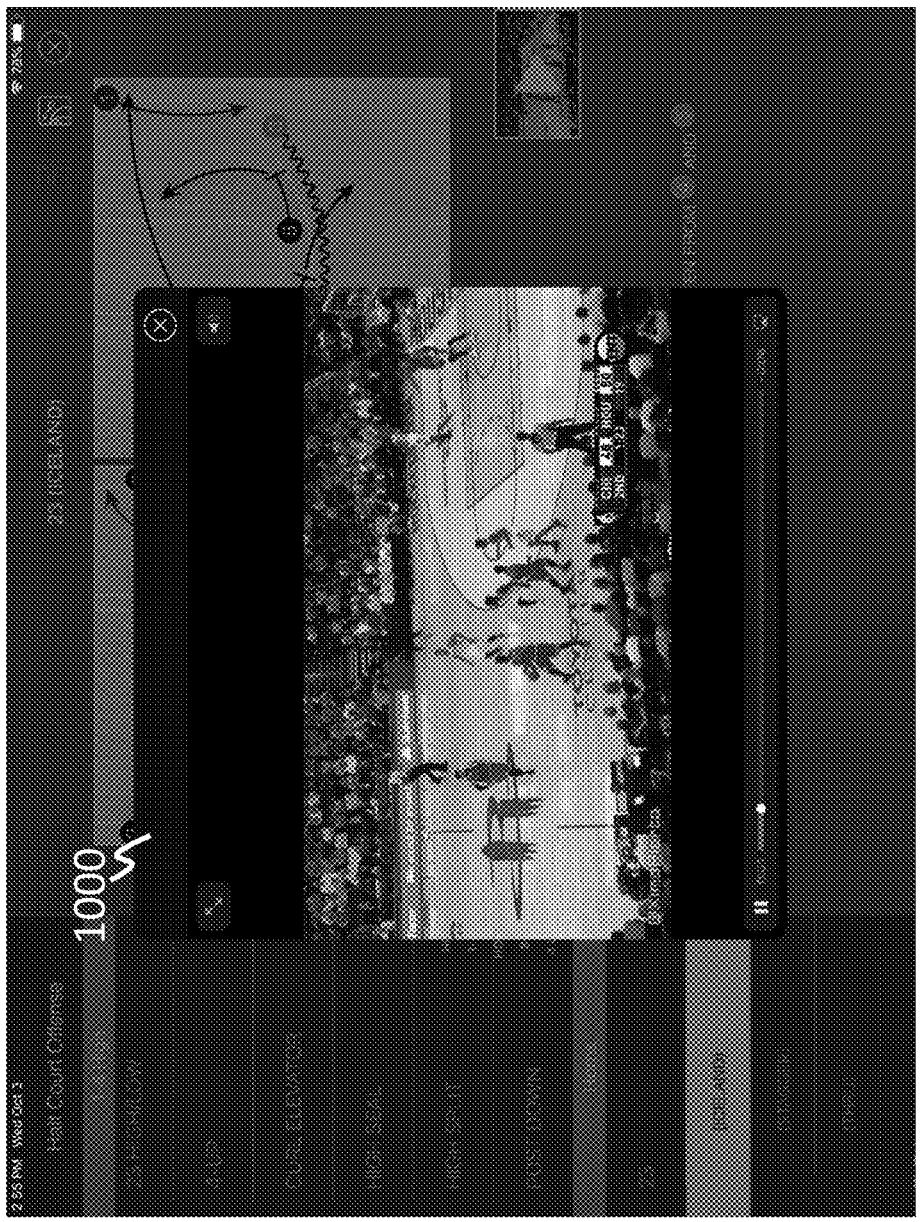
FIG. 10 depicts an embedded video according to various embodiments; [0017]
Figure 11B:
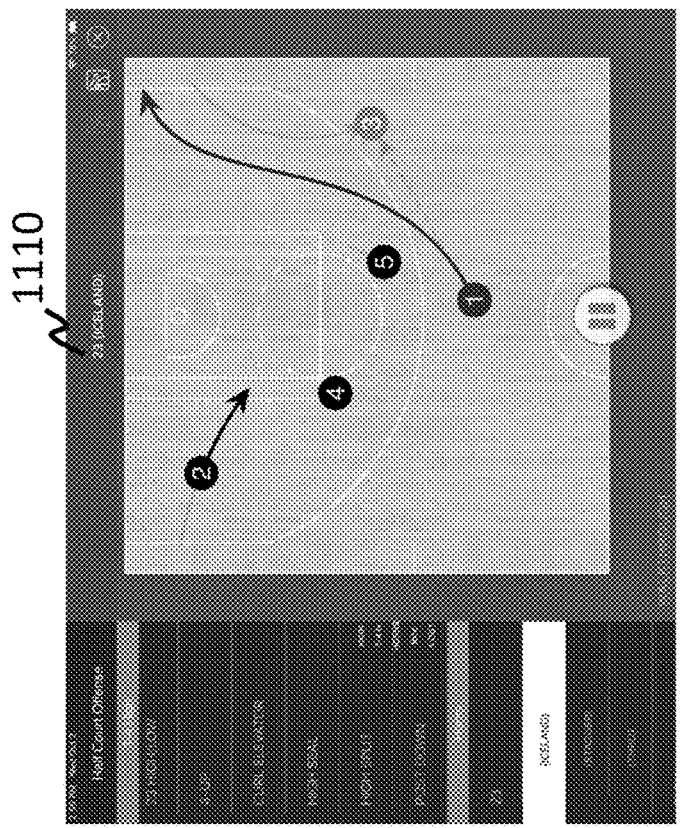
FIGS. 11A-F depict various stages of an animation according to various embodiments.
Figure 11A:
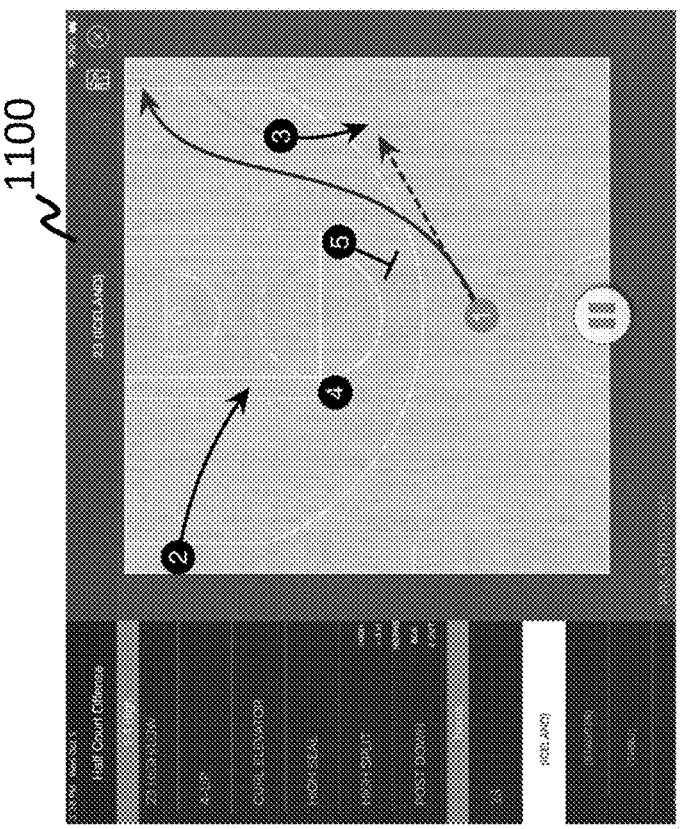
Figure 11D:
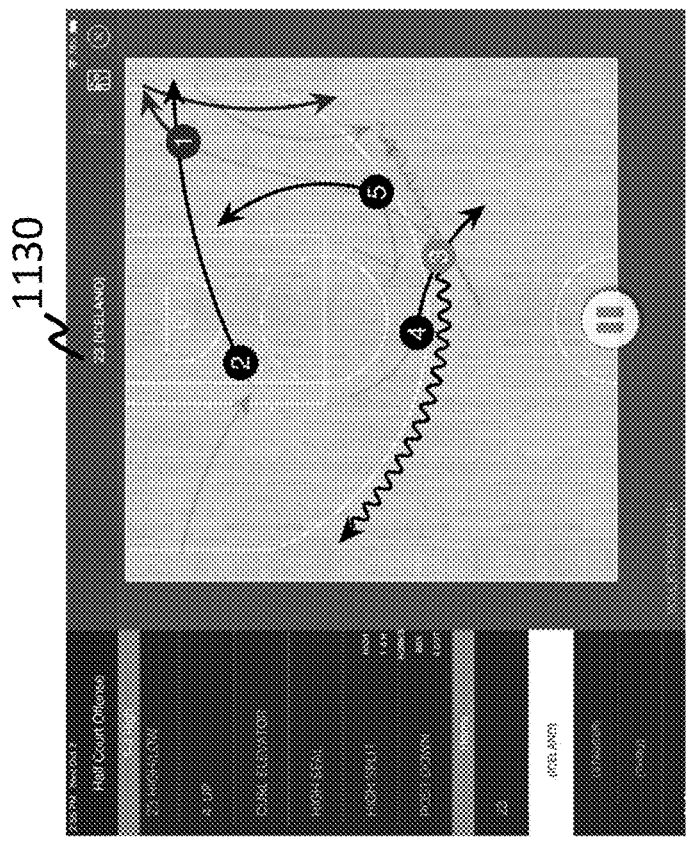
Figure 11C:
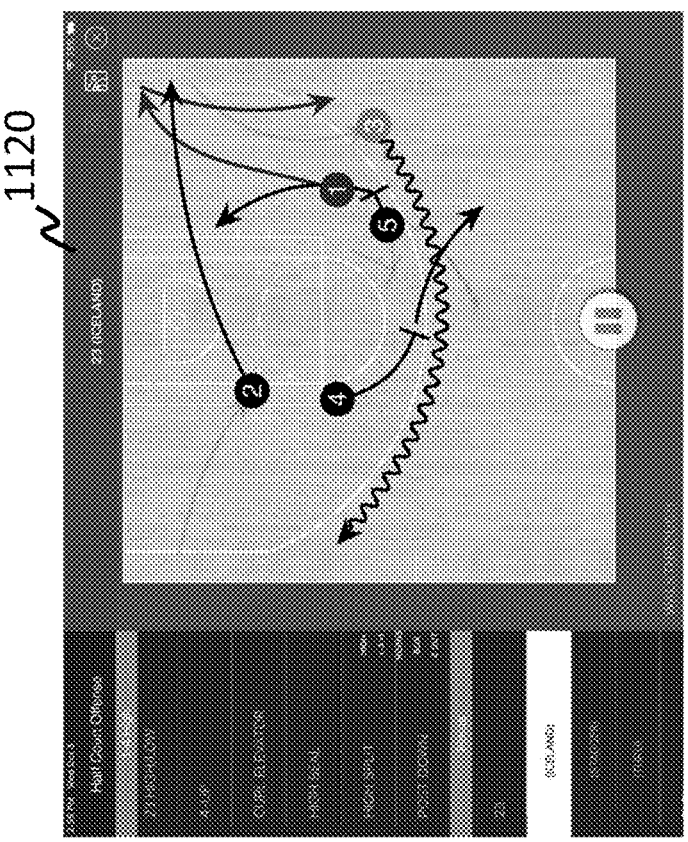
Figure 11F:
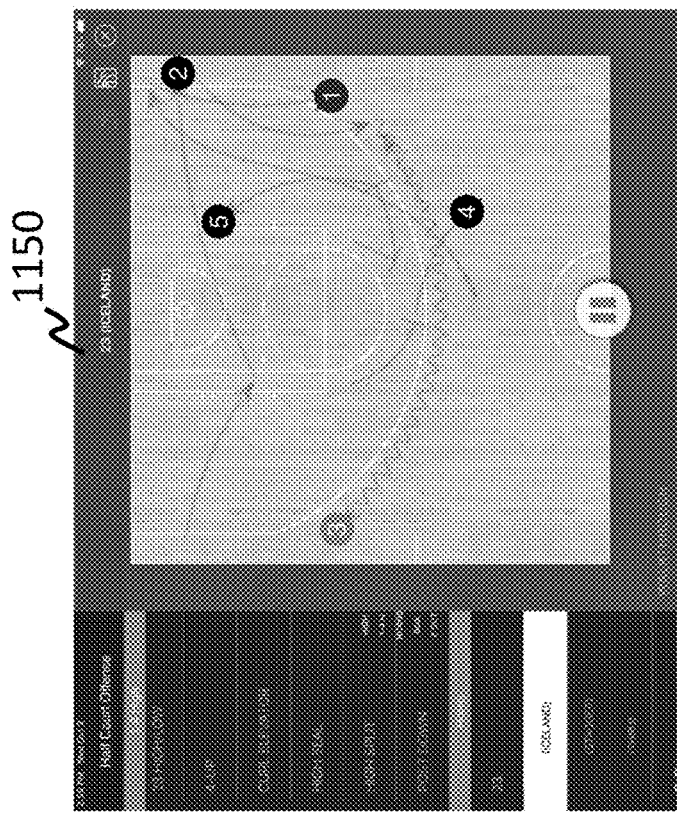
Figure 11E:
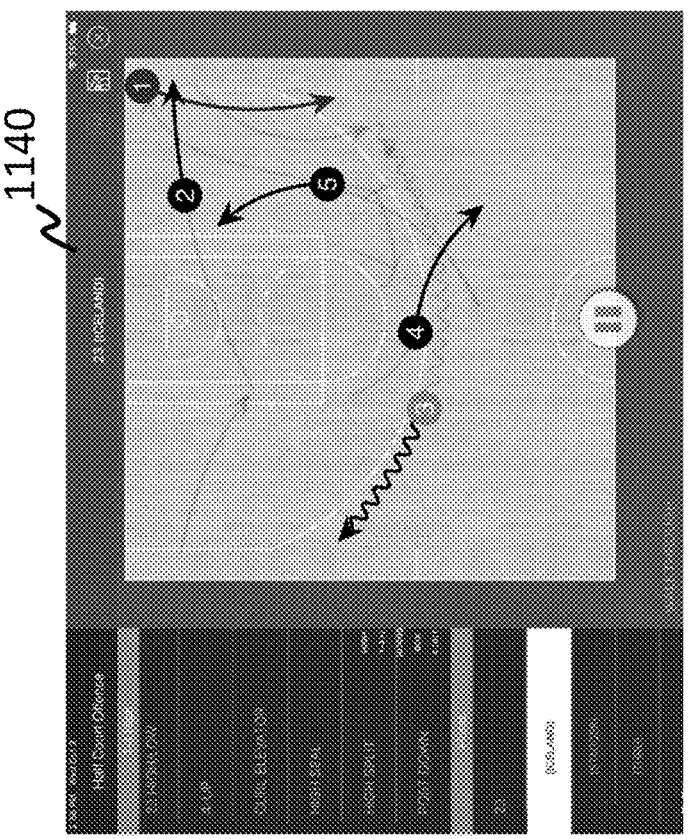

FIG. 10 depicts an embedded video according to various embodiments.

Referring to FIG. 10, the user may activate an embedded video 1000 (e.g., a live action video) of the play being performed.

FIGS. 11A-F depict various stages of an animation according to various embodiments.

Referring to FIGS. 11A-F, in various embodiments, the animation may begin in a first position 1100 and transition to a second position 1110, third position 1120, fourth position 1130, fifth position 1140, and sixth position 1150 based on the timing of the play. In various embodiments, the animation may transition between multiple phases of a play.

Figure 12B:
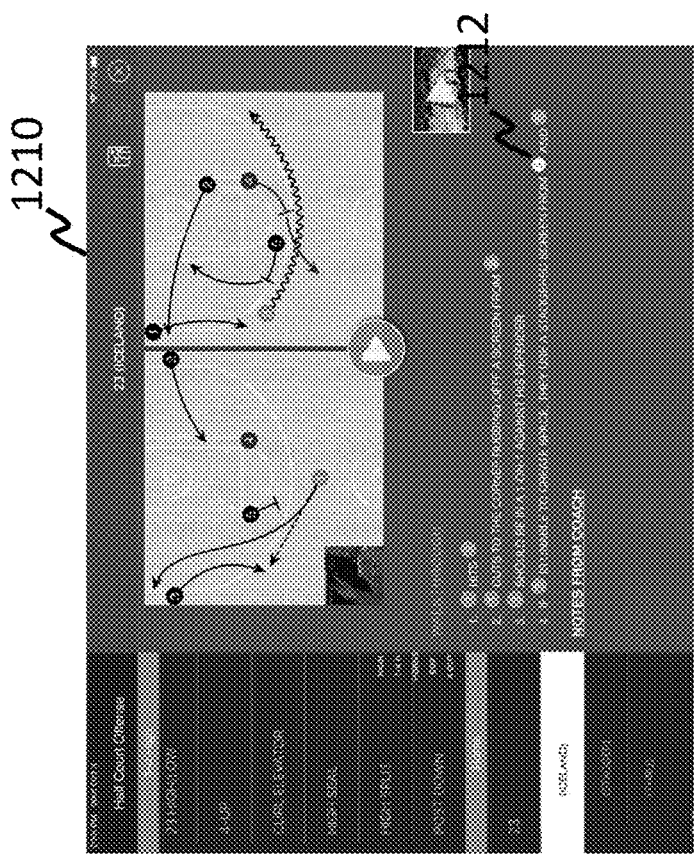
FIGS. 12A and 12B depict examples of user position highlighting according to various embodiments.
Figure 12A:
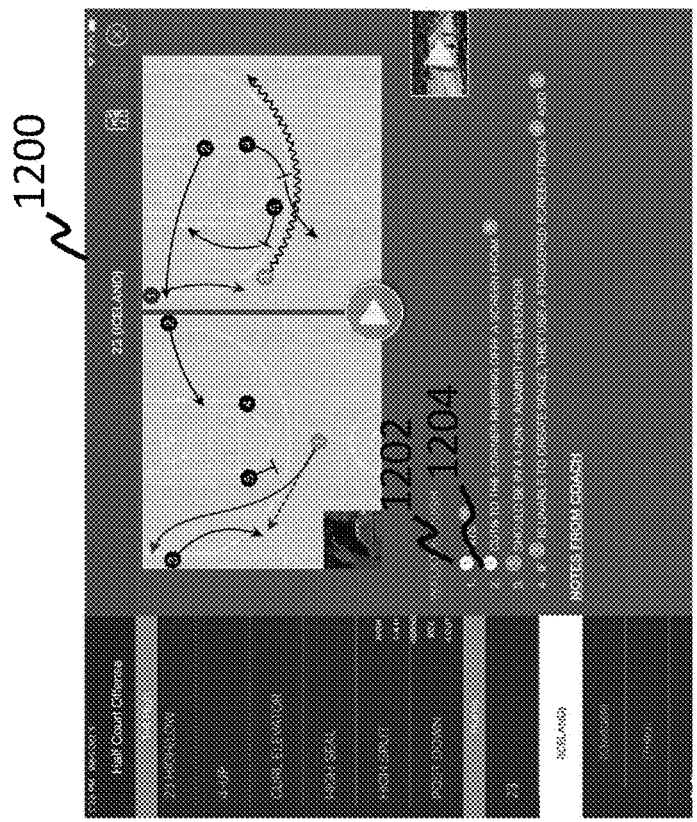

FIGS. 12A and 12B depict examples of user position highlighting according to various embodiments.

Referring to FIGS. 12A and 12B, the system may be configured to highlight notes directed towards a position input by a player. For example, the play 1200 may be customized to be viewed by a player playing the "1" position and the walkthrough includes highlighted note elements 1202, 1204 that correspond to the "1" position. Similarly the play 1210 may be customized to be viewed by a player playing the "4" position and the walkthrough includes highlighted note elements 1212 that corresponds to the "4" position.

Figure 13:
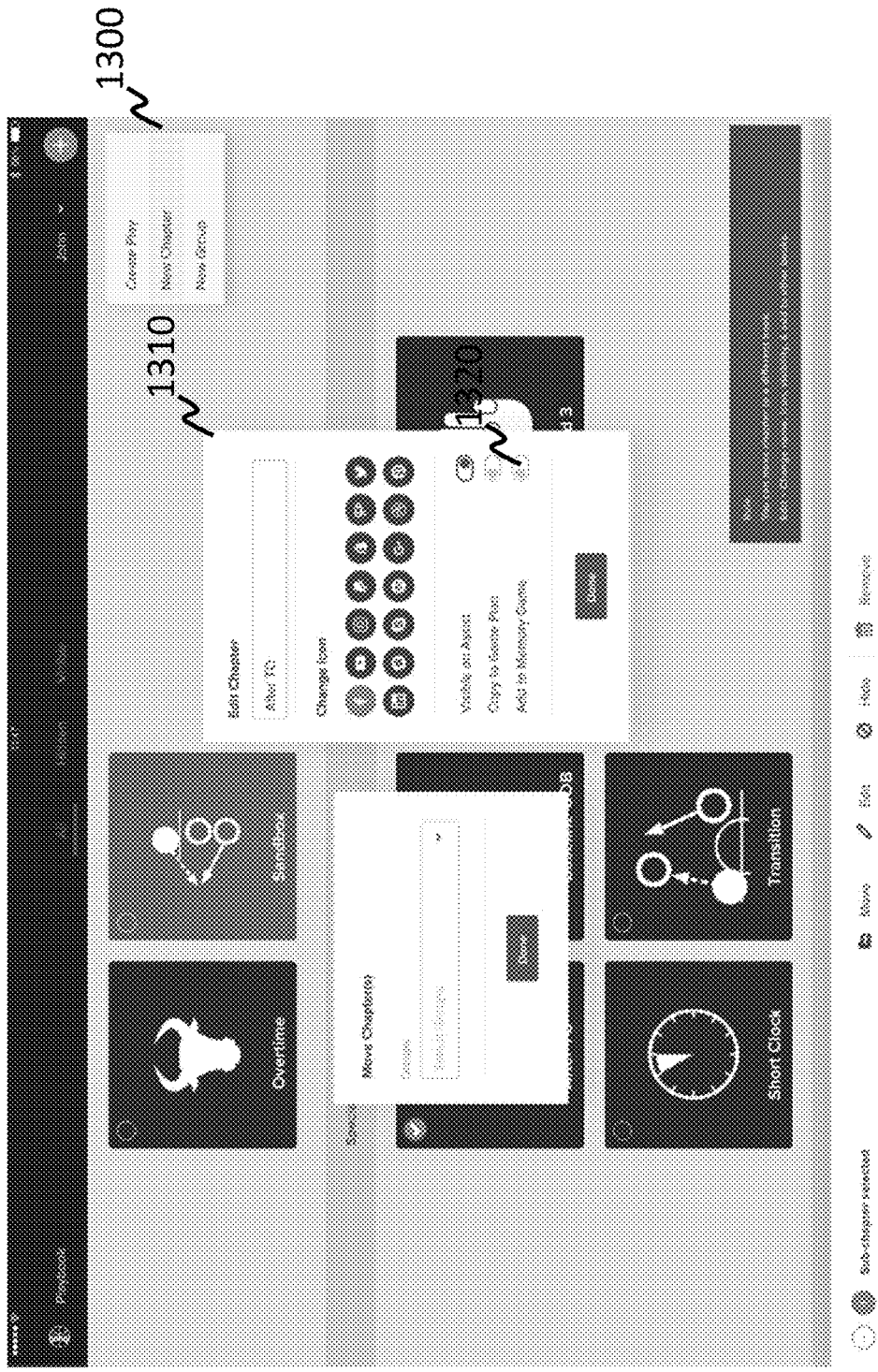
FIG. 13 depicts an example menu for creating or editing a play, chapter or group according to various embodiments.

FIG. 13 depicts an example menu for creating or editing a play, chapter or group according to various embodiments.

Referring to FIG. 13, in various embodiments, the menu 1300 may include an option to create or edit a play, chapter, or group. In various embodiments, the menu may include one or more sub-menus 1310 that include options to automatically generate memory games 1320 for the play, chapter, or group being created or edited.

Figure 14:
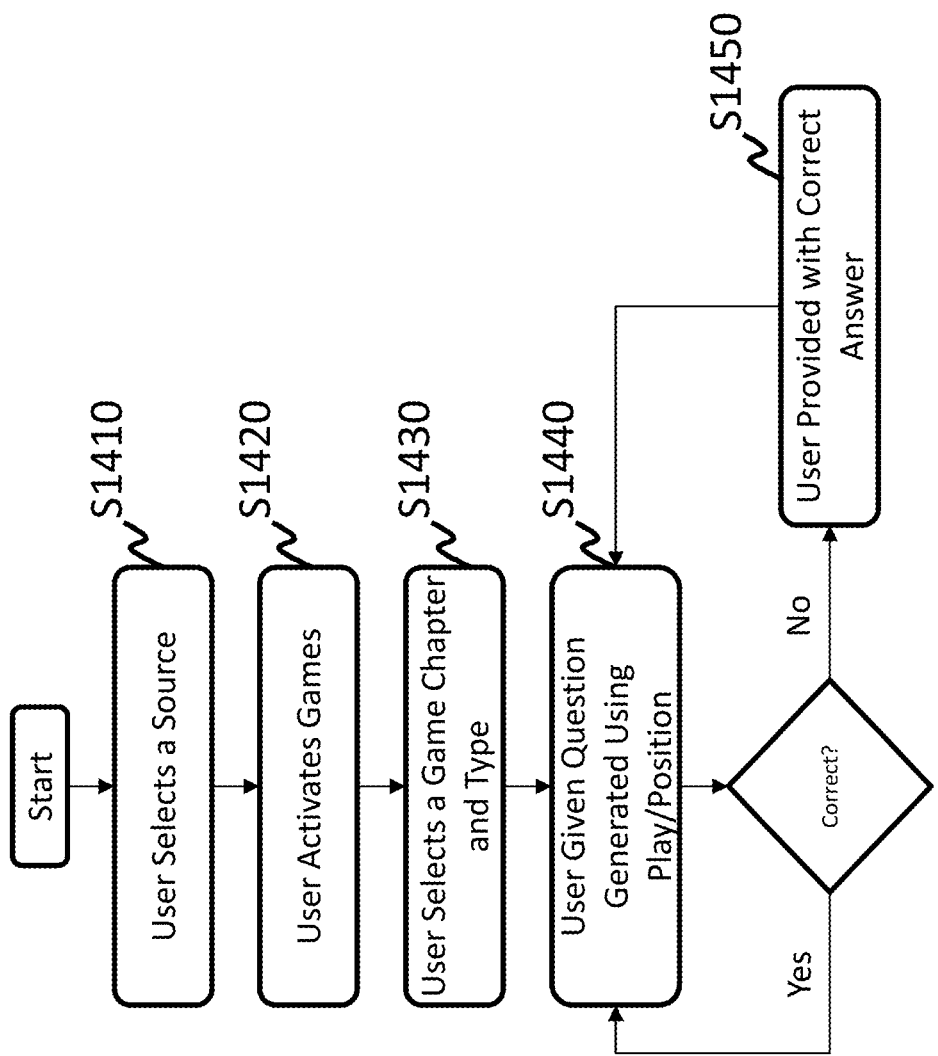
FIG. 14 depicts a method of the generation and playing of memorization games according to various embodiments.

FIG. 14 depicts a method of the generation and playing of memorization games according to various embodiments.

Referring to FIG. 2 and FIG. 14, in various embodiments, the system is configured to automatically generate personalized memorization games using the drawing and animation data (e.g., the drawing and animation information discussed above with reference to FIGS. 2-8).

In various embodiments, the system's 200 method of recording drawing data using the diagram module 252 and the animation module 256 allows for the capture of locations, sequence, and timing of people of objects allows the system 200 to create a complete data representation of when every action happens and what it is dependent upon. Thus, the game module 258 may utilize the previously entered diagram and animation data. Thus, in various embodiments, instead of only utilizing drawing data, the game module 258 may utilize the location, sequence, and timing data that is acquired based on player movement throughout a play. In various embodiments, the movement may also be captured using video data (e.g. using automated analysis of images and/or videos) or location data tracked by a GPS-like system (an indoor or outdoor position tracking system). In various embodiments, the game questions may be generated by the game module 258 operating on the content creator device 220 or may be generated by the game module 234 operating on the content consumer device.

In various embodiments, the game module may use the acquired data (e.g., from the diagram module 252 and/or the animation module 256, or using another data capture method) and identify which object/person in a drawing the user relates to (e.g., based on sport's position), and what actions are their individual responsibility and what/who they depend on. The game module is further configured to identify all of the associated assets (e.g., images, video, diagrams, animations, motion capture, or other suitable assets) associated with a drawing to use as a possible question/answer set.

In various embodiments, when a user wishes to play a memorization game, the user may begin by selecting a source for generating the game (i.e., what the user would like to work on memorizing or to test their knowledge) (S1410). The user then selects an existing set of plays (e.g., playbook chapter), or creates a new one ad-hoc selecting individual drawings to include to turn into a memory game. This is a 'one-button' option the user chooses to make these plays available for memory games.

In various embodiments, a user then launches one of the available memory games (S1420), and identifies which chapter, game type, and question types they wish to play (S1430). The game module 258 may access the collection of drawings (e.g., diagrams), and the user's identifying attributes (e.g., position), and creates a randomized question order. Options for randomization include correct answer, possible wrong answers, question type, question order, etc. For example, by adding randomization, every time a user launches the game module 258, the game module 258 may provide a new experience, even if using the same set and game type.

A user is then asked a series of questions based on the selected criteria (S1440). If user answers correctly, the user is attributed a score for the answer, a total score may be incremented according to the score, and the game module 256 moves on to the next question. In various embodiments, when a user answers incorrectly they may be forced to view an animation or diagram illustrating the correct answer before moving on (S1450). In various embodiments, the questions may be based upon a drawing in general (e.g., "What is this drawing's name?") or about the actions inside a drawing (e.g., "where do you setup?", "Trace your first cut.", "Where do you pass next?") or any other suitable source.

When a user ends a game, either by quitting or time-expiring, their final total game score along with all details about every question answer are recorded for tracking their participation and progress. In various embodiments, a leader board may be displayed to the user. In various embodiments, multiple leader boards may be displayed based on individual games and/or challenges. For example, a challenge may be initiated by another user such as a coach or other player. Scores, badges, and awards may be achieved based on the results of the challenge and displayed as part of the lead board or in conjunction with the leader board. In various embodiments, the user's score may be based on whether the answer was correct, an error margin for the question, a response time, a correct answer streak, and/or any other suitable metric.

FIGS. 15A-15D depict potential questions according to various embodiments.

Figure 15B:
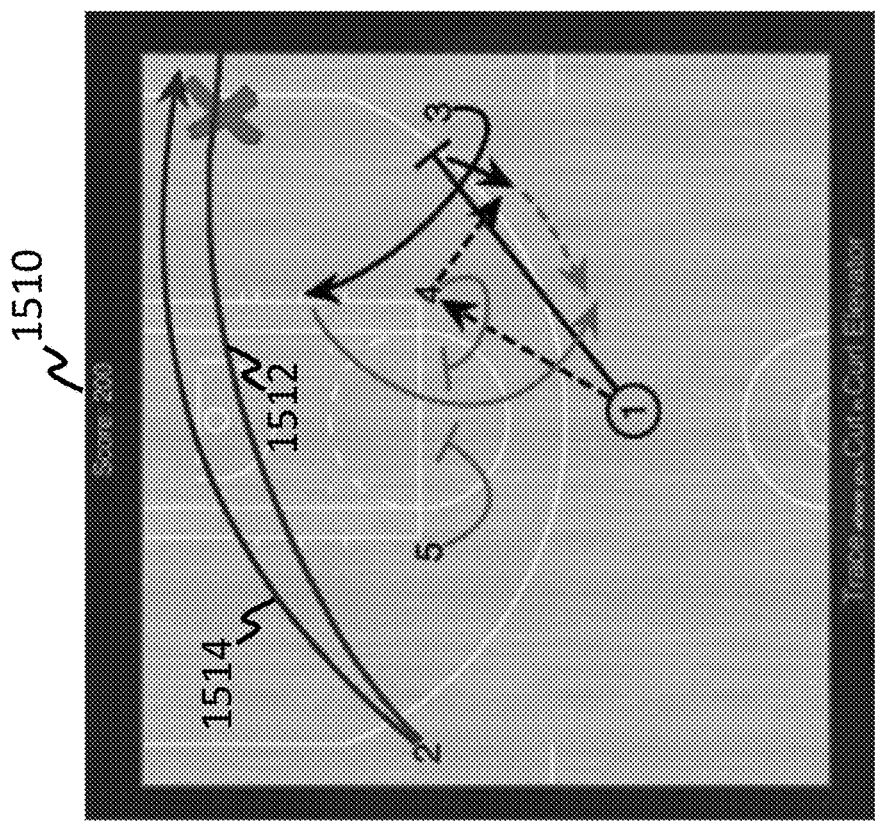
FIGS. 15A-15D depict potential questions according to various embodiments.
Figure 15A:
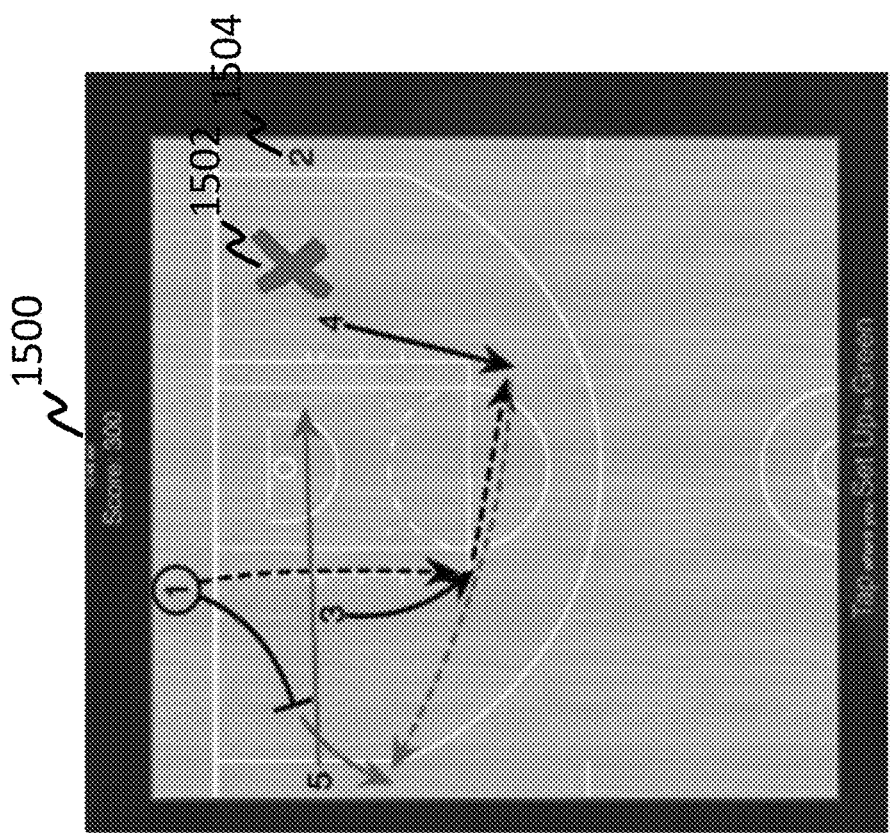
Figure 15D:
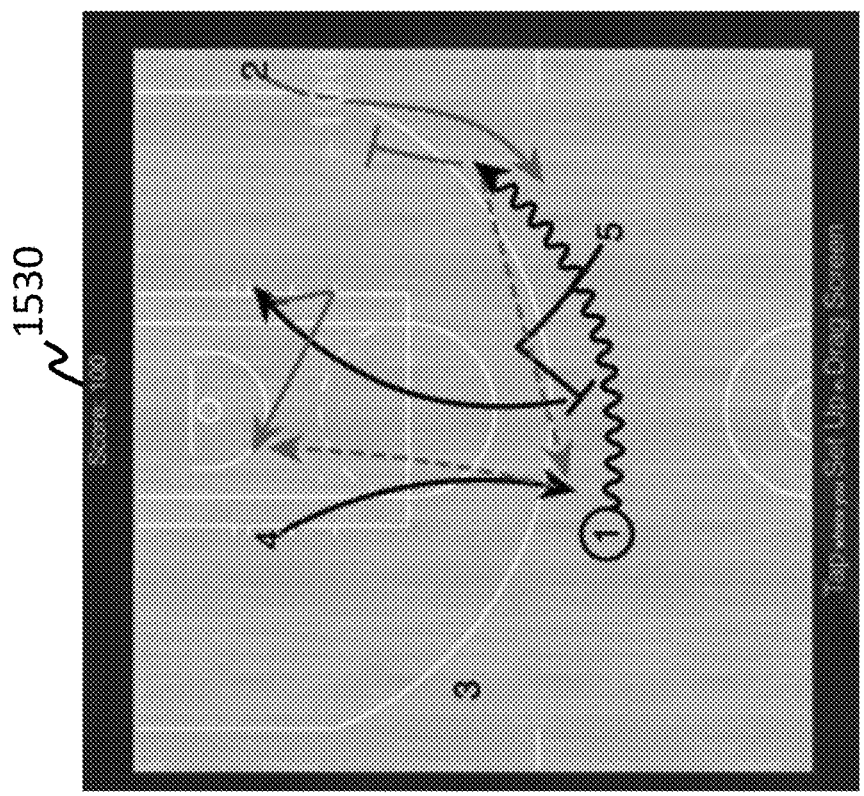
Figure 15C:
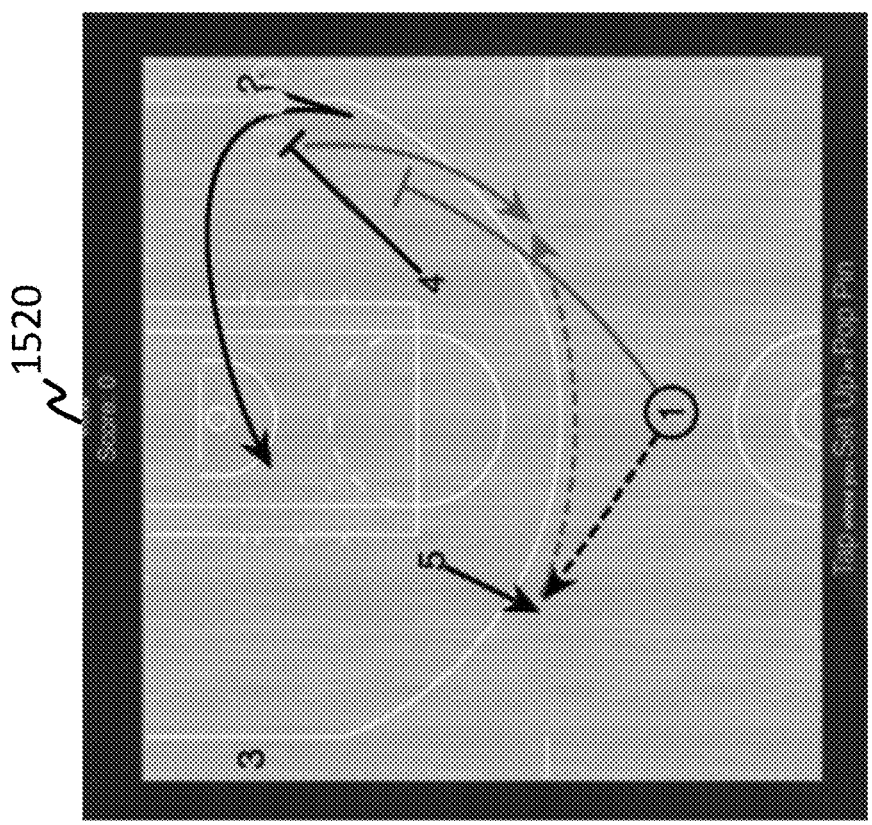

Referring to FIGS. 15A-15D, in various embodiments, as discussed above, the game module 258 may be configured to generate and display questions based upon the diagrams generated in conjunction with user input. In various embodiments, a question may require a user to indicate a location. For example, the question module may be configured to randomly select a play from a playbook and randomly select a question type related to the play. In various embodiments, the question type may be related to the user's identified position. For example, in FIG. 15A, the question may entail the user being of position type "2" and the question may prompt the user to indicate on the diagram 1500 where the user is supposed to setup at the beginning of the play. For example, the user may indicate the location 1502 as their setup location by providing an input (e.g., a touch or mouse input) to the user's device. In this example, the user indicated the incorrect starting or set up location 1502. In various embodiments, the correct location 1504 may be displayed after an incorrect answer. In another example, the user may be provided a question that prompts the user to indicate where they are supposed move during a play. The question is generated using the diagram information and the player's route is removed. For example, in FIG. 15B, the user has been prompted to trace where the player is supposed to move. In this example, the user may again be of the position of type "2" and has provided the trace 1512 as an input. In this example, the user was incorrect and the correct trace 1514 is displayed. FIGS. 15-15D depict further example questions 1520, 1530 that the user answered correctly. In these cases, the user receives points for the correct answer and their score is incremented. In various embodiments, each question may be associated with an error margin. For example, a user may indicate a location or trace that is relatively correct, but not at the exact location of the correct answer. In various embodiments, the error margin may include a radius (e.g., a creator defined radius) around a location or along a path.

Figure 16A:
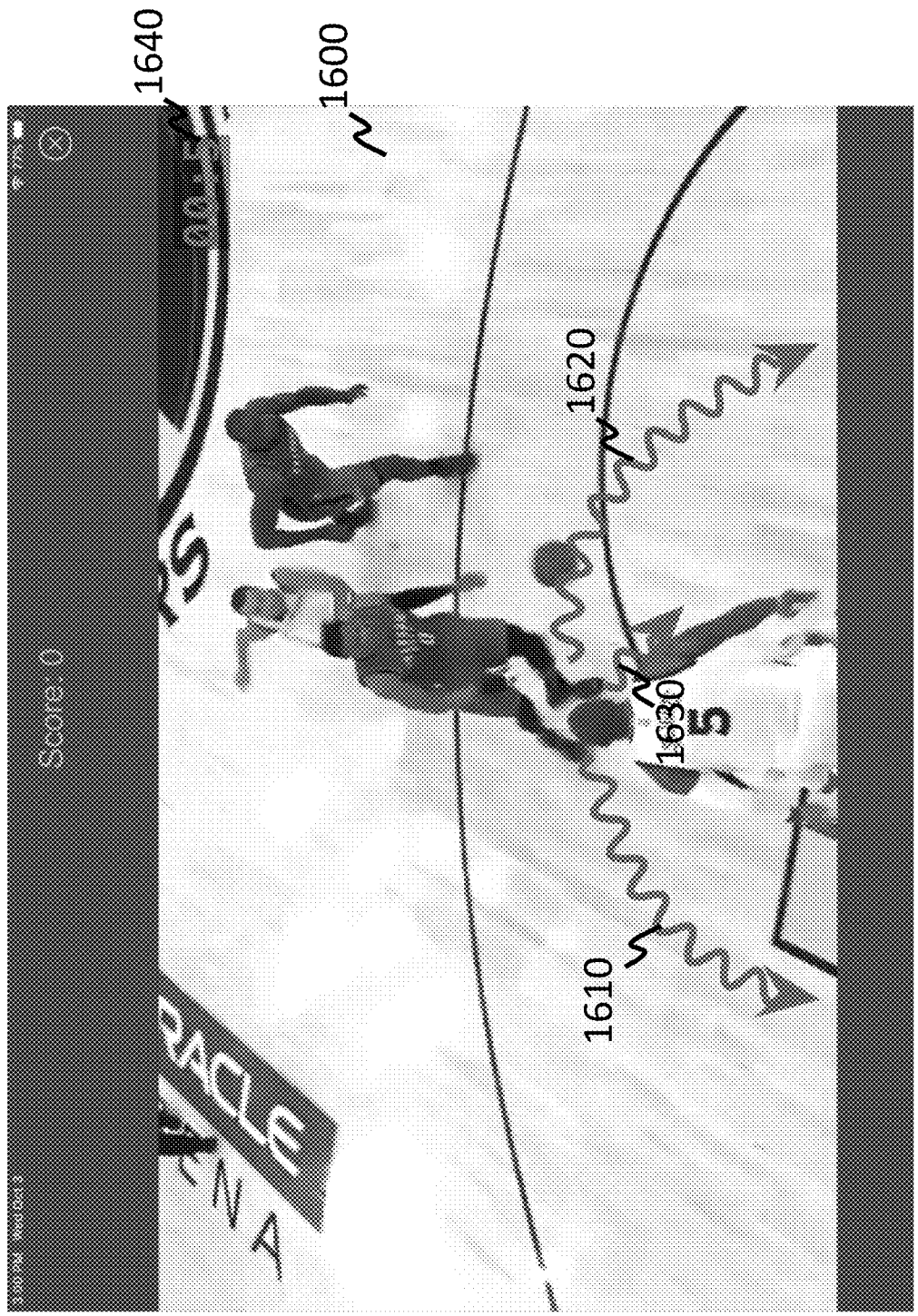
FIGS. 16A and 16B depict memory games that involve embedded videos according to various embodiments.
Figure 16B:
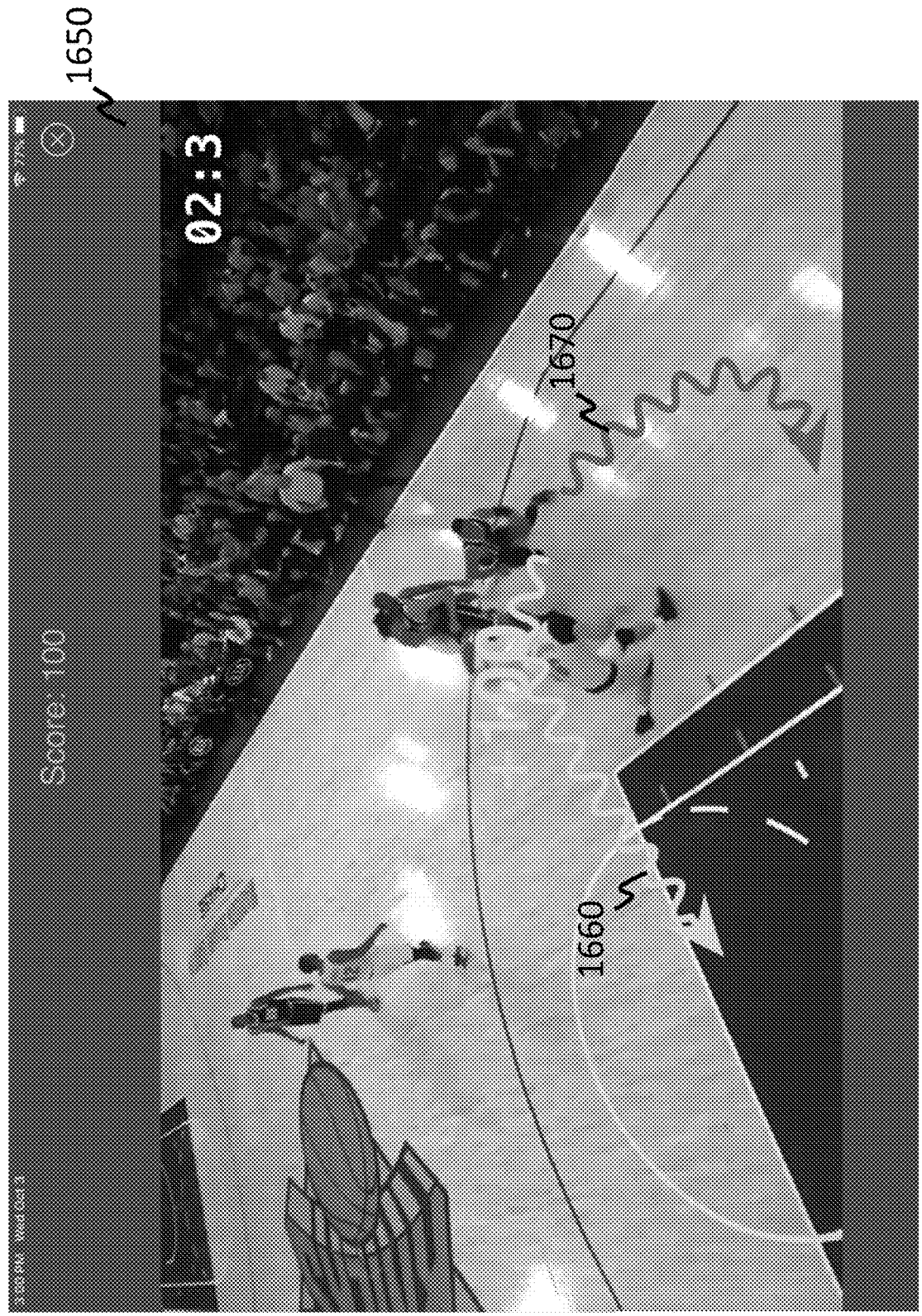

FIGS. 16A and 16B depict memory games that involve embedded videos according to various embodiments.

Referring to FIGS. 16A and 16B, in various embodiments, memory games featuring live videos 1600, 1650 associated with a play may be generated. The memory game may include showing a video clip and then freezing the video clip at a frame where a player makes a decision about the play. For example, the user may have to select a path 1610, 1620, 1630, 1660, 1670 associated with the play being performed. In various embodiments, there may be a countdown timer 1640 for how long the user has to answer the question to achieve a score. When a user selects a correct path 1660 before the countdown timer reaches zero, the user may be awarded points.

Figure 17B:
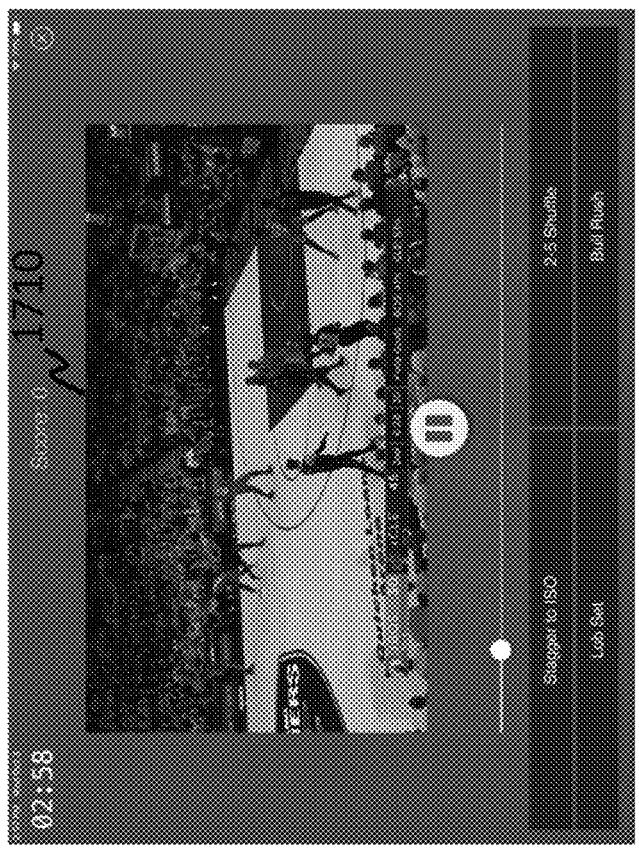
FIGS. 17A-17C depict memory games according to various embodiments.
Figure 17A:
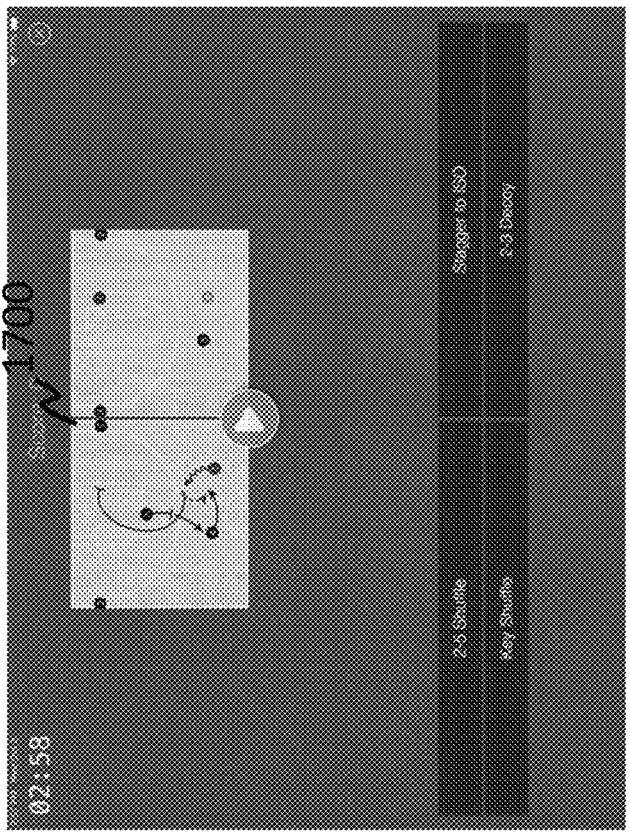
Figure 17C:
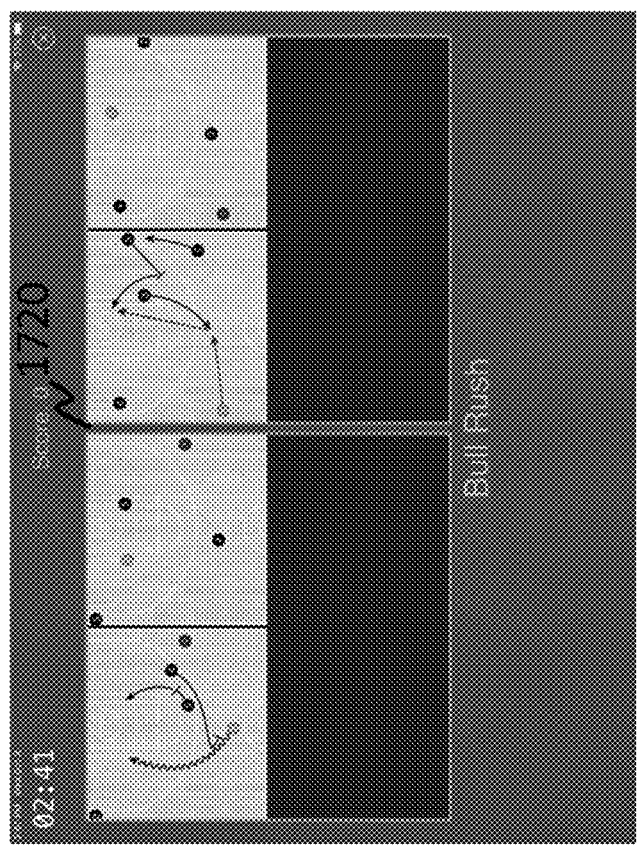

FIGS. 17A-17C depict memory games according to various embodiments.

Referring to FIGS. 17A-17C, in various embodiments, memory games may be configured to show a content 1700, 1710, 1720 and select the correct play name associated with the content. For example, in various embodiments, the content may include a play animation 1700, a video 1710, or static play images 1720.

Figure 18:
FIGS. 18-20 depict various reports that may be generated and displayed based on user use of the system according to various embodiments.
Figure 19:
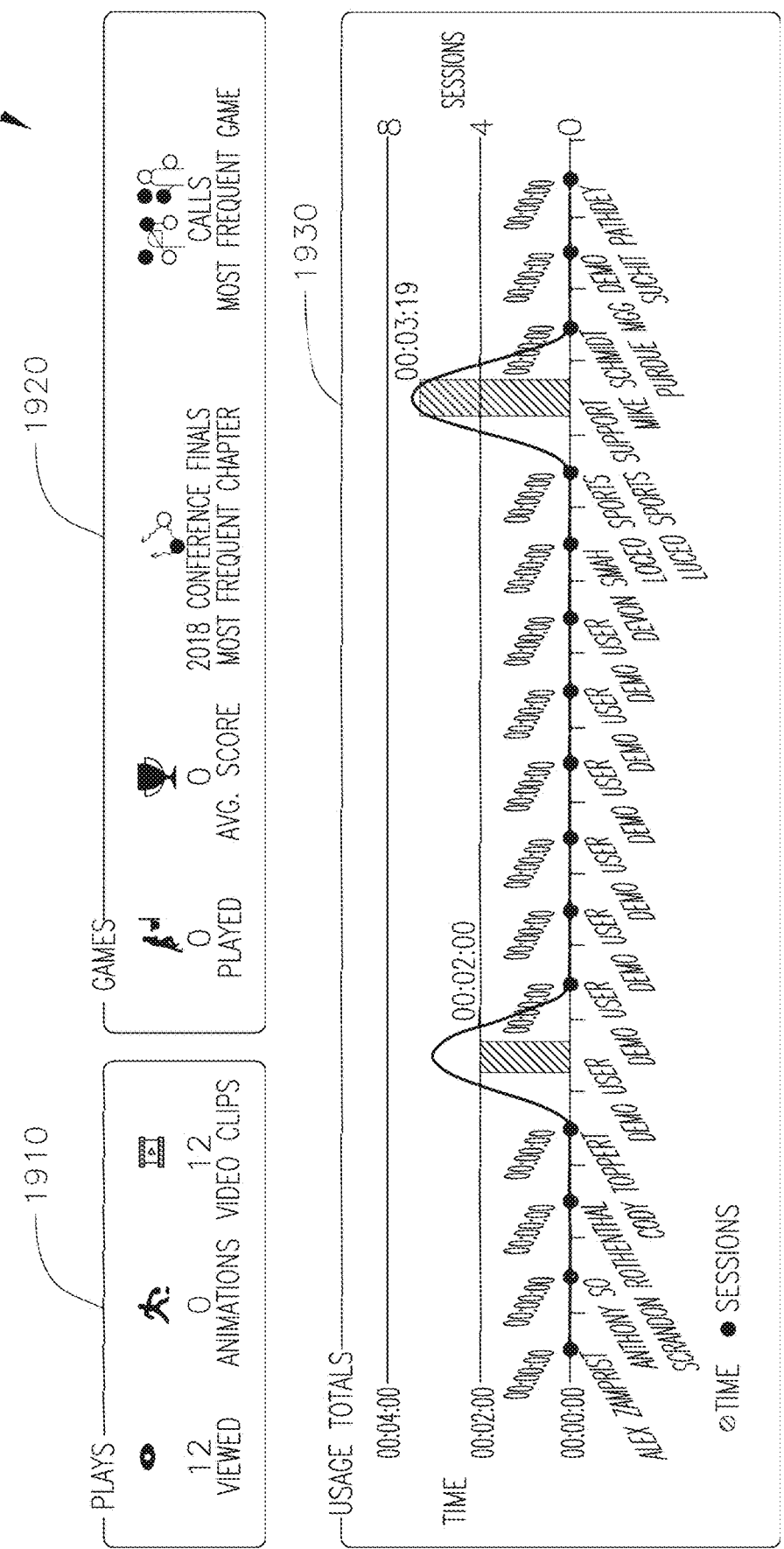
Figure 20:
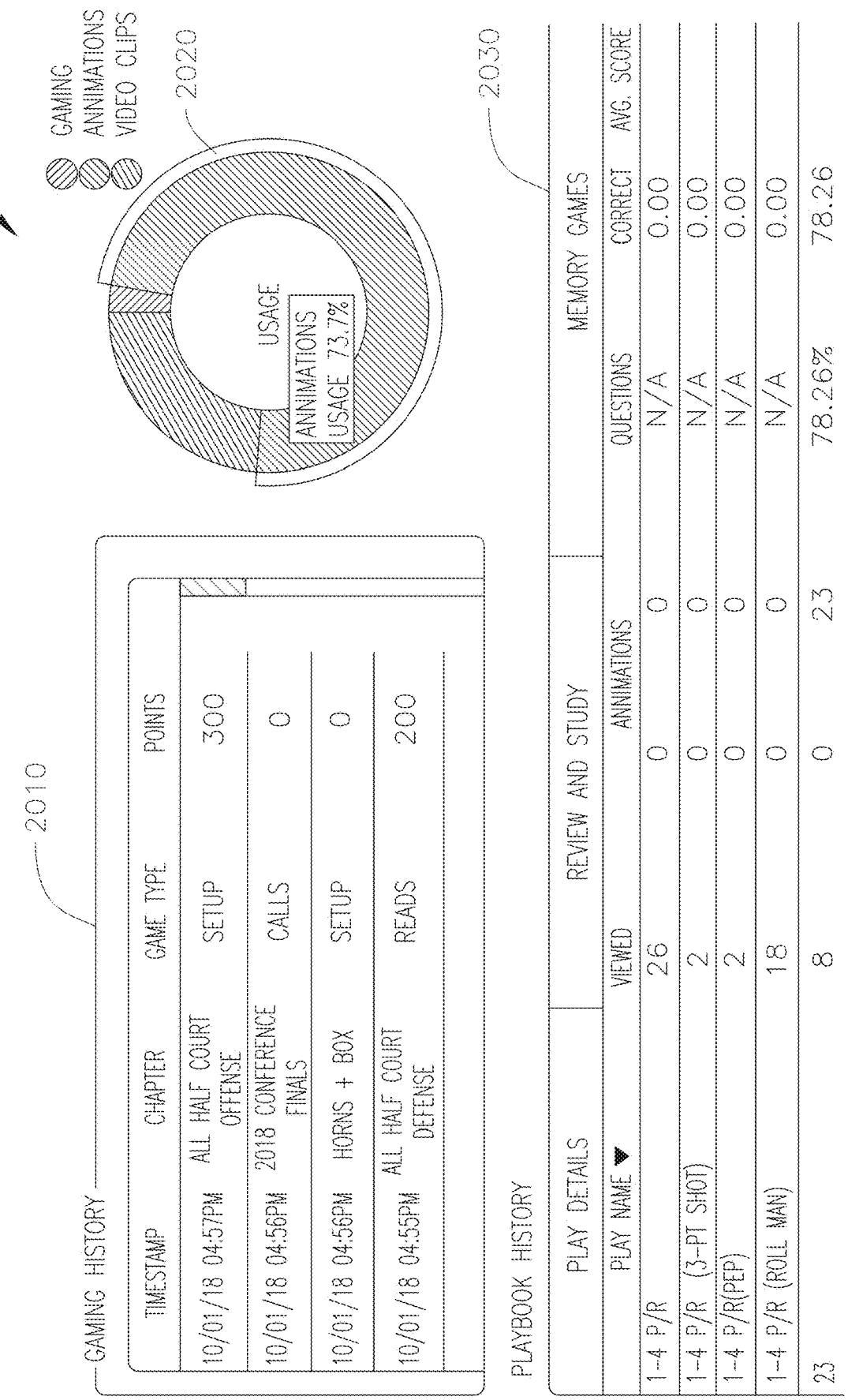

FIGS. 18-20 depict various reports that may be generated and displayed based on user use of the system according to various embodiments.

Referring to FIG. 18, in various embodiments the system may log the use of the system. For example, the system (e.g., via the reports module 236) may keep track each question answered along with information about the question and metrics 1800 related to the user answering the question. For example, in various embodiments, the system may log the date and time of the user's answering of the question, the game chapter that the question is base on, the game type associated with the question, and the question type. In various embodiments the metrics may include the amount of time it took for the user to answer the question (e.g., the response time), whether the user answered correctly, an error margin of the user's provided answer, the score awarded for the answer, and any other suitable metric.

Referring to FIGS. 19 and 20, in various embodiments, the system may also provide various visualizations for relaying the user's system usage. For example, the system may provide the visualizations 1900 for displaying information related to the user's access to plays 1910 (e.g., total number of plays viewed as diagrams, animations, and videos), for displaying information related to the user's access to games 1920 (e.g., the total number of games played, the average score of the games played, the most frequent game chapter used, and the most frequent game played), and for displaying information related to the time spent by the user 1930 (e.g., a graphical view of the dates and times of the user's access of the system). In various embodiments, the system may also provide more detailed visualizations. For example, the user may view more detailed gaming history 2010 and playbook history 2030. The system may also provide graphical information showing the user's usage history 2020.

Figure 21:
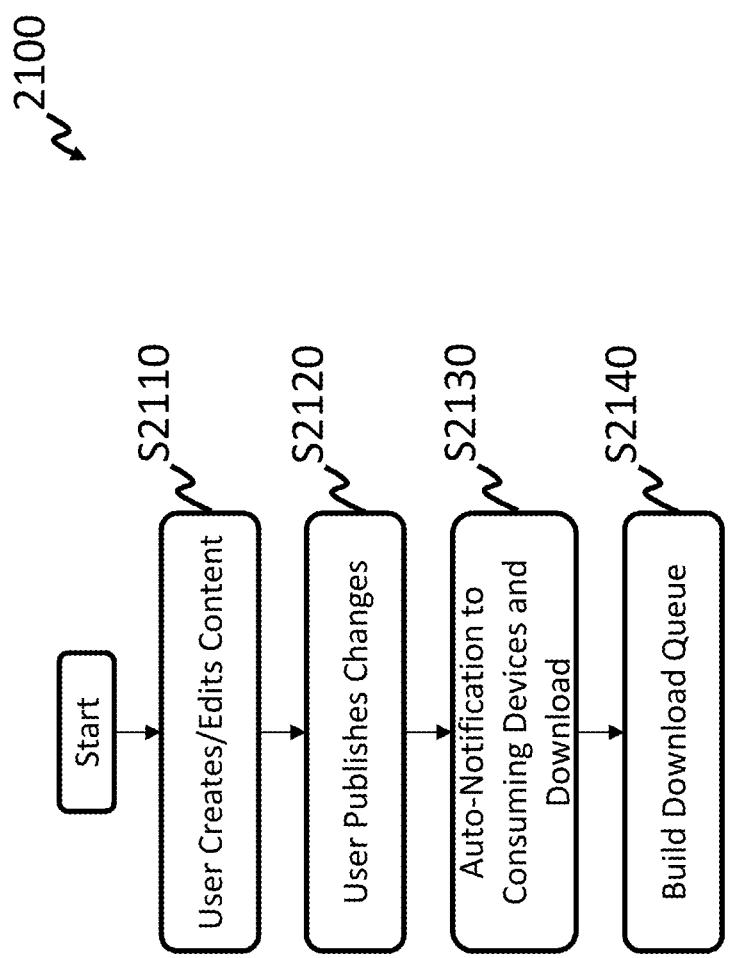
FIG. 21 depicts an example method of distributing diagrams and updates to users.

FIG. 21 depicts an example method of distributing diagrams and updates to users.

Referring to FIG. 21, in various embodiments, the system is configured to allow for the distribution of new diagrams and updated diagrams to users 2100. In various embodiments, a user (e.g., a coach) may elect to create a new diagram or edit an existing diagram (S2110). The user may utilize the content creation module 250 to generate and edit the diagrams. Once the changes/new diagrams are complete the user may publish the diagrams by uploading them from their device 220 to a server (e.g., to a database 120 operating on remote server depicted in FIG. 1) (S2120). Once new or updated diagrams are received at the server, the server may automatically notify the appropriate consuming devices of the new content and prompt content viewing modules 230 may prompt the content consumer devices to download the new content (S2130). Upon initiating the download, the content consumer device builds a download queue (S2140) by checking for any missing assets (e.g., diagrams, animations, videos, etc.). The download of the missing assets is then started and each asset becomes available for use once downloaded.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to,"

or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or 10 more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, specific structural or functional descriptions disclosed herein are merely illustrative for the purpose of describing embodiments according to the concept of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the claims and their equivalents.

What is claimed is:

1. An electronic sports playbook distribution system, comprising:
  a. a first electronic device including:
    i. a display device;
    ii. an input mechanism;
    iii. a processor;
    iv. a network interface;
    v. a memory coupled to the processor, wherein the memory stores instructions that, when executed by the processor, cause the processor to, in any order:
      1. display an image of a surface on the display device;

2. detect, using the input mechanism, the placement of an object on the surface;
  3. detect, using the input mechanism, a drawing of a path of the object from a first location on the surface to an end location on the surface;
  4. determine at least one action based on at least (a) the object, (b) an attribute of the object relating to possession of a ball, and (c) the path of the object;
  5. transmit, using the network interface, a data file of sports playbook content to a server, the data including information describing at least (a) the object, (b) the path associated with the object, and (c) the action.

2. The electronic sports playbook distribution system of claim 1, wherein the surface is configured to be a type of surface such as a basketball court, a high school basketball court, a NBA basketball court, a football field, a NFL football field, or any other sporting surface.

3. The electronic sports playbook distribution system of claim 2, wherein the type of surface is used to define a coordinate system.

4. The electronic sports playbook distribution system of claim 2, wherein the memory of the first electronic device stores instructions that, when executed by the processor of the first electronic device, cause a set of objects associated with the surface to be automatically placed over the displayed image of the surface.

5. The electronic sports playbook distribution system of claim 1, wherein the surface is a video recording of a play.

6. The electronic sports playbook distribution system of claim 1, wherein the object is configured to represent a person, a player, a defender, a coach, a physical object, a ball, a cone, a machine, or a note bubble.

7. The electronic sports playbook distribution system of claim 1, wherein the attribute of the object is a label, a color, a player position on the team, or an item of information describing if the object has possession of the ball.

8. The electronic sports playbook distribution system of claim 1, wherein the action is determined to be a dribbling movement when: (a) the object is a player, (b) the attribute of the object relating to the possession of the ball indicates that the player has the ball, and (c) the end location of the path is another location on the surface that is not occupied by another player.

9. The electronic sports playbook distribution system of claim 1, wherein the action is determined to be a pass when: (a) the object is a player, (b) the attribute of the object relating to the possession of the ball indicates that the player has the ball, and (c) the end location of the path is another location on the surface that is occupied by another player.

10. The electronic sports playbook distribution system of claim 1, wherein the action is determined to be a cut when: (a) the object is a player, (b) the attribute of the object relating to the possession of the ball indicates that the player does not have the ball, and (c) the end location of the path is another location on the surface that is not occupied by another player.

11. The electronic sports playbook distribution system of claim 1, wherein the action is determined to be a screen when: (a) the object is a player, (b) the attribute of the object relating to the possession of the ball indicates that the player does not have the ball, and (c) the end location of the path is another location on the surface that is occupied by another player.

12. The electronic sports playbook distribution system of claim 1, wherein the at least one action is a dribbling movement, a cut, a screen, a handoff of the ball, a pass of the ball, or a shot of the ball.

13. The electronic sports playbook distribution system of claim 1, further comprising:
  b. a second electronic device including:
    i. a display device;
    ii. an input mechanism;
    iii. a processor;
    iv. a network interface;
    v. a memory coupled to the processor, wherein the memory stores instructions that, when executed by the processor, cause the processor to, in any order:
      1. request from the server, using the network interface of the second electronic device, the data file of sports playbook content;
      2. display, using the display device, a graphic representation of at least a portion of the sports playbook content, the graphic representation including a path diagram placed on top of the displayed surface, wherein the path diagram is displayed based on the path and the at least one action.

14. The electronic sports playbook distribution system of claim 13, wherein the at least one action is a dribbling movement, and the path diagram is displayed as a zig zag line along the path.

15. The electronic sports playbook distribution system of claim 13, wherein the at least one action is a pass of the ball, and the path diagram is displayed as a dashed line along the path.

16. The electronic sports playbook distribution system of claim 13, wherein the at least one action is a screen, and the path diagram is displayed as a line along the path ending with a line perpendicular to the path.

17. The electronic sports playbook distribution system of claim 13, wherein the at least one action is a cut motion, and the path diagram is displayed as a line along the path ending with an arrowhead.

18. The electronic sports playbook distribution system of claim 13, wherein the graphic representation of the sports playbook content is an animation of the object performing the action along the first path.

19. The electronic sports playbook distribution system of claim 13, wherein the server includes:
  i. a processor;
  ii. at least one network interface;
  iii. at least one storage device; and,
  iv. a memory coupled to the processor of the server; wherein the memory of the server stores instructions that when executed by the processor of the server cause the processor of the server to, in any order:
    1. receive, using the network interface of the server, the data file of sports playbook content from the first electronic device;
    2. store, using the storage device of the server, the data file of sports playbook content received from the first electronic device; and
    3. transmit a notification to the second electronic device, using the network interface of the server, the notification including information configured to inform the second electronic device that the data file of sports playbook content is available for download from the server.

20. The electronic sports playbook distribution system of claim 19, wherein:
- a. the memory coupled to the processor of the second electronic device further stores instructions that, when executed by the processor, cause the processor to, in any order:
  - i. receive, using the network interface of the second electronic device, the notification;
  - ii. generate a download queue of sports playbook content that is available on the server and not present in the memory of the second electronic device; and,
  - iii. download, using the network interface of the second device content items based on the download queue.

\* \* \* \* \*